US008665253B2

(12) United States Patent
Yamada

(10) Patent No.: US 8,665,253 B2
(45) Date of Patent: Mar. 4, 2014

(54) CONTROL APPARATUS OF ELECTRO-OPTIC APPARATUS, ELECTRO-OPTIC APPARATUS AND ELECTRONIC APPARATUS

(75) Inventor: Yusuke Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 103 days.

(21) Appl. No.: 13/440,803

(22) Filed: Apr. 5, 2012

(65) Prior Publication Data

US 2012/0256888 A1 Oct. 11, 2012

(30) Foreign Application Priority Data

Apr. 7, 2011 (JP) ................................ 2011-085806

(51) Int. Cl.
*G06F 3/038* (2013.01)
*G09G 5/00* (2006.01)

(52) U.S. Cl.
USPC ........... 345/204; 345/107; 345/156; 359/245; 359/296

(58) Field of Classification Search
USPC ................. 345/107, 156, 168, 173–183, 697; 359/245, 296
See application file for complete search history.

(56) References Cited

U.S. PATENT DOCUMENTS

2004/0186947 A1* 9/2004 Nagata et al. ................. 711/103
2008/0104368 A1* 5/2008 Hasegawa ....................... 712/14
2009/0256798 A1 10/2009 Low et al.
2011/0001748 A1 1/2011 Rutman et al.

FOREIGN PATENT DOCUMENTS

JP 2009-251615 A 10/2009

* cited by examiner

*Primary Examiner* — Lun-Yi Lao
*Assistant Examiner* — Insa Sadio
(74) *Attorney, Agent, or Firm* — Maschoff Brennan

(57) ABSTRACT

Each of a plurality of regions of a display unit is provided with an access flag indicative of whether a writing operation is performed on pixels in a corresponding region. It is determined whether the corresponding operation is performed on each of the regions based on the access flag. When the corresponding operation is necessary, image data written in a memory is compared with estimated image data. As a result, when a new writing operation is necessary, the new writing operation starts to be performed on each pixel after a previous writing operation is terminated. When the writing operation is terminated on all the pixels included in the region, the state of the access flag corresponding to the relevant region is changed to a state in which the writing operation is not necessary.

7 Claims, 15 Drawing Sheets

CONTROL APPARATUS OF ELECTRO-OPTIC APPARATUS, ELECTRO-OPTIC APPARATUS AND ELECTRONIC APPARATUS

BACKGROUND

1. Technical Field

The present invention relates to a control apparatus of an electro-optic apparatus, an electro-optic apparatus, and an electronic apparatus.

2. Related Art

As a display apparatus which displays an image, there is a display apparatus using an electrophoretic method with microcapsules. The display apparatus using an active matrix method is provided with a driving circuit which drives a microcapsule at each of the intersections of a plurality of row electrodes extended in the row direction and a plurality of column electrodes extended in the column direction. When a voltage is applied to the row electrodes and the column electrodes, electrical potential difference is generated between electrodes provided in the driving circuit and electrodes which face the electrodes provided in the driving circuit while interposing the microcapsules therebetween. When the electrical potential difference is generated between the electrodes which face each other while interposing the microcapsules therebetween, white particles and black particles which are included in each of the microcapsules move based on an electric field which is generated by the electrical potential difference. When the distribution of the white particles and the black particles which are included in each of the microcapsules changes, an optical reflectance property varies, so that an image is displayed.

However, in the display apparatus using the electrophoretic method, rewriting of an image may be performed across a plurality of frames when display is changed using the active matrix method. However, if the rewriting is started on an entire screen when the rewriting of the image is performed across the plurality of frames, it is difficult to perform new writing for a time period until the writing is terminated. Therefore, when an image is edited or deleted, a subsequent writing starts after writing of an image is terminated once, so that it takes long time, thereby causing a problem from the viewpoint of operability.

Here, in order to solve such a problem, a method of performing writing by performing a pipeline process in units of a partial region is designed (refer to JP-A-2009-251615). According to the method disclosed in JP-A-2009-251615, when an image is written in two partial regions which are not overlapped with each other on a screen by deviating timing, writing can be started on a partial region on which writing is started afterward even though writing of a partial region on which writing is started in advance is not completed, so that display speed is improved compared to a case where this method is not used.

In the apparatus disclosed in JP-A-2009-251615, an image is displayed in such a way that image data is written in a memory which stores data for each pixel of the image to be displayed and the written data is read. When the display apparatus changes the image, the image is changed in such a way that the memory is accessed for each pixel. However, in this display apparatus, the number of accesses to the memory increases as the number of pixels increases, so that the power which is consumed when the memory is accessed increases.

SUMMARY

An advantage of some aspects of the invention is to reduce the number of accesses to a memory when an image is displayed, thereby restricting power consumption.

An aspect of the invention is directed to a control apparatus of an electro-optic apparatus including a display unit which has a plurality of pixels, and in which writing is performed in order to change the display state of each of the pixels from a first display state to a second display state by applying a voltage more than once, the display unit having a plurality of regions; a writing region determination unit which obtains an access flag indicative of whether the writing operation is performed on pixels in each of the regions from a storage unit storing the access flag for each of the regions, and which determines whether to perform the writing operation on the pixels included in a region corresponding to the obtained access flag based on the access flag; a writing state determination unit which, with respect to the pixels included in the region on which the writing region determination unit determined to perform the writing operation, compares image data written in a memory with estimated image data indicative of an estimated image to be displayed on the corresponding display unit by performing the writing operation in progress, and determines whether a previous writing operation is being performed on the pixels when a new writing operation is necessary; a writing control unit which starts to perform the new writing operation on the pixels when the writing state determination unit determines that the writing operation is not in progress on the pixels, continues the writing operation in progress when the writing state determination unit determines that the writing operation is in progress on the pixels, and then starts the new writing operation after the writing operation in the progress is terminated; and a flag state change unit which changes the state of the access flag corresponding to the relevant region to a state in which the writing operation is not necessary when the writing operation performed on all pixels included in the region is terminated.

According to the aspect of the invention, the number of accesses to the memory is reduced when an image is displayed, thereby restricting power consumption.

In the control apparatus, the plurality of pixels may be provided in a plurality of rows and a plurality of columns, and a single row of the pixels may correspond to the region.

According to this configuration, when the writing operation is not necessary for a single row of pixels, the single row of pixels of the memory is not accessed, so that the number of accesses to the memory is reduced when an image is displayed, thereby restricting power consumption.

In the control apparatus, the plurality of pixels may be provided in a plurality of rows and a plurality of columns, and a plurality of rows of the pixels may correspond to the region.

According to this configuration, when the writing operation is not necessary for the plurality of rows of pixels, the plurality of rows of pixels of the memory is not accessed, so that the number of accesses to the memory is reduced, thereby restricting power consumption.

In the control apparatus, the plurality of pixels may be provided in a plurality of rows and a plurality of columns, and a block of pixels in adjacent two or more rows and two or more columns may correspond to the region.

According to this configuration, when the writing operation is not necessary for the pixels in the plurality of rows and the plurality of columns, access to the memeory, which corresponds to the plurality of rows and the plurality of columns, is not performed, so that the number of accesses to the memory is reduced, thereby restricting power consumption.

In the control apparatus, when the image data is written in the memory, each access flag provided for each of the plurality of regions may be set to a state in which the writing operation is necessary.

According to this configuration, when the image data is written in the memory, the state of the access flag is set to a state in which the writing operation is necessary, so that it is possible to start to write an image even when a notification of the writing of the image data to the memory is not provided from an external apparatus.

Another aspect of the invention is directed to an electro-optic apparatus including a display unit which has a plurality of pixels, and in which writing is performed in order to change a display state of each of the pixels from a first display state to a second display state by applying a voltage more than once, the display unit having a plurality of regions; a writing region determination unit which obtains an access flag indicative of whether the writing operation is performed on pixels in each of the regions from a storage unit storing the access flag for each of the regions, and which determines whether to perform the writing operation on the pixels included in a region corresponding to the obtained access flag based on the access flag; a writing state determination unit which, with respect to the pixels included in the region on which the writing region determination unit determined to perform the writing operation, compares image data written in a memory with estimated image data indicative of an estimated image to be displayed on the corresponding display unit by performing the writing operation in progress, and determines whether a previous writing operation is being performed on the pixels when a new writing operation is necessary; a writing control unit which starts to perform the new writing operation on the pixels when the writing state determination unit determines that the writing operation is not in progress on the pixels, continues the writing operation in progress when the writing state determination unit determines that the writing operation is in progress on the pixels, and then starts the new writing operation after the writing operation in progress is terminated; and a flag state change unit which changes the state of the access flag corresponding to the relevant region to a state in which the writing operation is not necessary when the writing operation performed on all pixels included in the region is terminated.

According to the aspect of the invention, the number of accesses to the memory is reduced when an image is displayed, thereby restricting the power consumption.

Meanwhile, the aspect of the invention can be construed as an electronic apparatus including the corresponding electro-optic apparatus in addition to the electro-optic apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
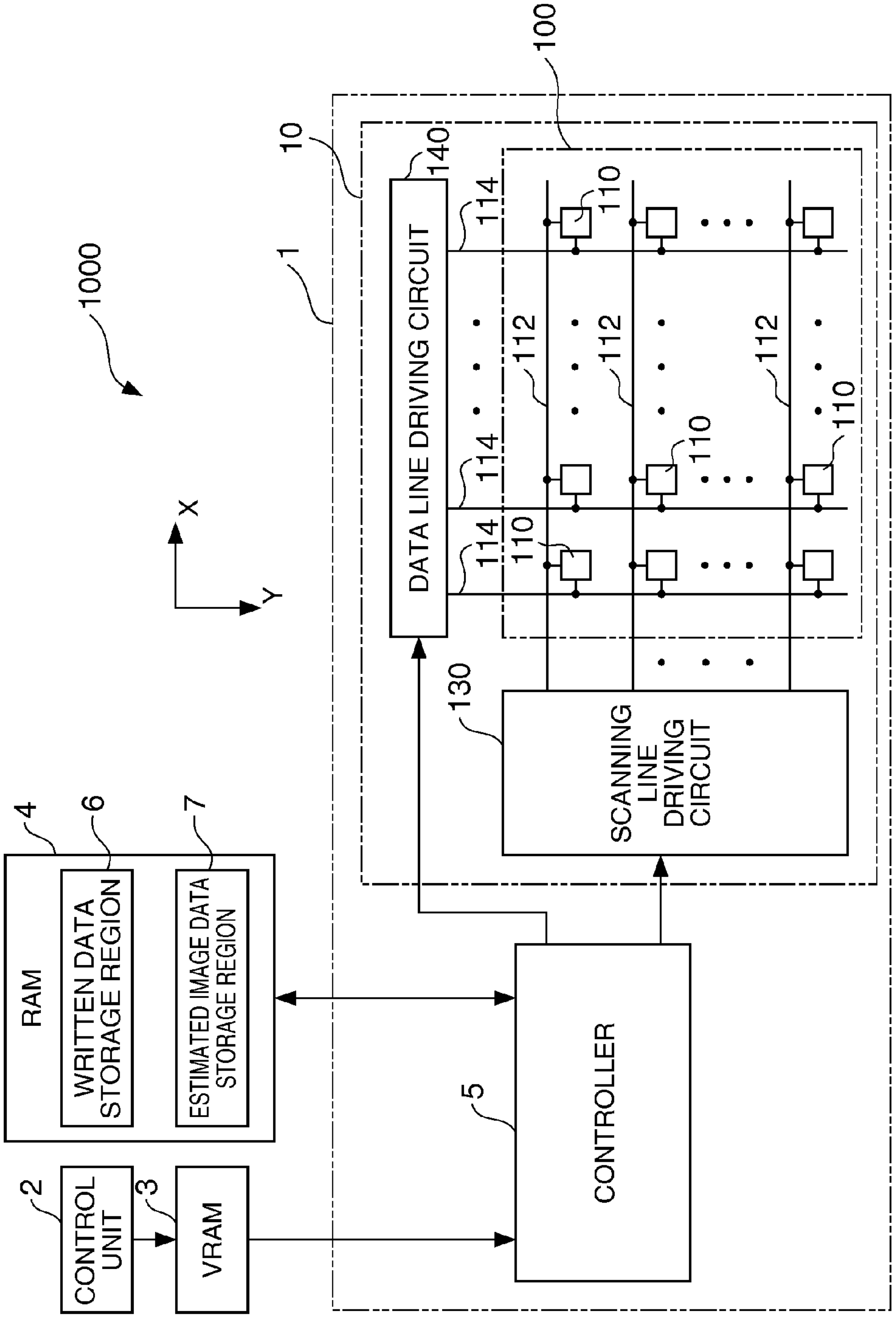
FIG. 1 is a view illustrating the hardware configuration of a display apparatus and an electro-optic apparatus.

FIG. 1 is a block diagram illustrating the hardware configuration of a display apparatus 1000 and an electro-optic apparatus 1 according to an embodiment of the invention. The display apparatus 1000 is an apparatus which displays an image and includes the electro-optic apparatus 1 using an electrophoretic method, a control unit 2, a Video Random Access Memory (VRAM) 3, and a Random Access Memory (RAM) 4 which is an example of a storage unit. Further, the electro-optic apparatus 1 includes a display unit 10 and a controller 5.

The control unit 2 is a microcomputer which includes a Central Processing Unit (CPU), a Read Only Memory (ROM), a RAM or the like, and controls each unit of the display apparatus 1000. Further, the control unit 2 accesses the VRAM 3 and writes image data indicative of an image to be displayed on the display region 100 into the VRAM 3.

The controller 5 supplies various types of signals, used to display an image on the display region 100 of the display unit 10, to a scanning line driving circuit 130 and a data line driving circuit 140 of the display unit 10. The controller 5 corresponds to the control apparatus of the electro-optic apparatus 1. Further, a section in which the control unit 2 is combined with the controller 5 can be defined as the control apparatus of the electro-optic apparatus 1. Alternatively, all of the control unit 2, the controller 5, the VRAM 3, and the RAM 4 can be defined as the control apparatus of the electro-optic apparatus 1.

The VRAM 3 is a memory which stores the image data written by the control unit 2. The VRAM 3 includes storage regions for respective pixels 110 which will be described later and which are arranged in m rows×n columns. The image data includes data indicative of the grayscale of each of the pixels 110, and the data indicative of the grayscale of a single pixel 110 is stored in a single storage region corresponding to the relevant pixel. The image data written in the VRAM 3 is read by the controller 5. The RAM 4 is a memory which stores various types of data used to display an image on the display region 100, and includes a written data storage region 6 and an estimated image data storage region 7.

In the display region 100, a plurality of scanning lines 112 is provided along the row (X) direction in the drawing, and a plurality of data lines 114 is provided along the column (Y) direction so as to mutually keep electrical insulation with the respective scanning lines 112. Further, each of the pixels 110 is provided to correspond to the intersection of each of the scanning lines 112 and each of the data lines 114. When it is assumed that the number of rows of the scanning lines 112 is "m" and the number of columns of the data lines 114 is "n" for descriptive purpose, the pixels 110 configure the display region 100 in such a way that the pixels are arranged in a matrix of vertical m rows×horizontal n columns.

Figure 2:
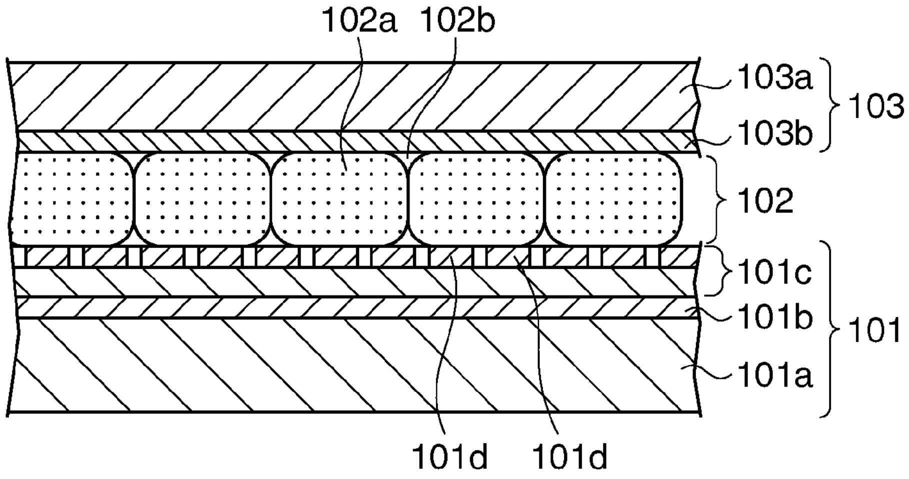
FIG. 2 is a view illustrating the cross-section of a display region.

FIG. 2 is a view illustrating the cross-section of the display region 100. The display region 100 approximately includes a first substrate 101, an electrophoretic layer 102, and a second substrate 103 as shown in FIG. 2. The first substrate 101 is a substrate in which a circuit layer is formed on a substrate 101*a* having insulation properties and flexibility. The substrate 101*a* is formed of polycarbonate in the present embodiment. Meanwhile, the substrate 101*a* is not limited to polycarbonate and a resin material which has lightweight properties, flexibility, elasticity, and insulation properties can be used. Further, the substrate 101*a* may be formed of glass which does not have flexibility. An adhesion layer 101*b* is provided on the surface of the substrate 101*a* and a circuit layer 101*c* is laminated on the surface of the adhesion layer 101*b*.

The circuit layer 101*c* includes the plurality of scanning lines 112 arranged in the row direction and the plurality of data line 114 arranged in the column direction. Further, the circuit layer 101*c* includes pixel electrodes 101*d* corresponding to the respective intersections of the scanning lines 112 and the data lines 114.

The electrophoretic layer 102 includes a binder 102*b* and a plurality of microcapsules 102*a* fixed by the binder 102*b*, and is formed on the pixel electrodes 101*d*. Meanwhile, an adhesion layer which is formed of adhesive may be provided between the microcapsules 102*a* and the pixel electrodes 101*d*.

There is no particular limitation in the binder 102*b* if the binder has good affinity with the microcapsules 102*a*, excellent adhesiveness with the electrodes, and an insulation property. A dispersion medium and electrophoretic particles are stored in each of the microcapsules 102*a*. It is preferable that a material, such as gum Arabic-gelatin system compound or urethane system compound, which has flexibility, be used as a material which configures the microcapsule 102*a*.

Any one of water, an alcohol system solvent (methanol, ethanol, isopropanol, butanol, octanol, methylcellosolve, or the like), esters (ethyl acetate or butyl acetates), ketones (acetone, methyl ethyl ketone, methyl isobutyl ketnoe or the like), aliphatic hydrocarbon (pentane, hexane, octane, or the like), alicyclic hydrocarbon (cyclohexane, methylcyclohexane, or the like), aromatic hydrocarbon (benzene, toluene, and benzens having a long-chain alkyl group (xylene, hexylbenzene, heptyl benzene, octyl benzene, nonyl benzene, decyl benzene, undecyl benzene, dodecyl benzene, tridecyl benzene, tetradecyl benzene, or the like)), halogenated hydrocarbon (methylene chloride, chloroform, carbon tetrachloride, 1,2-dichloroethane, or the like), and carboxylate salt may be used as the dispersion medium. Further, the dispersion medium may be formed of other oils. Further, these materials can be used for the dispersion medium independently or by mixture, and, further, may be used for the dispersion medium by combining with an interfacial active agent.

The electrophoretic particles are particles (polymer molecules or colloids) which have the properties of moving in the dispersion medium based on an electric field. In the present embodiment, white electrophoretic particles and black electrophoretic particles are stored in the microcapsule 102*a*. Each of the black electrophoretic particles is a particle formed of a black pigment, for example, aniline black or carbon black, and is positively charged in the present embodiment. Each of the white electrophoretic particles is a particle formed of a white pigment, for example, titanium dioxide or aluminum oxide, and is negatively charged in the present embodiment.

The second substrate 103 includes a film 103*a* and a transparent common electrode layer 103*b* (second electrode) formed on the under surface of the film 103*a*. The film 103*a* takes the responsibility of sealing and protecting the electrophoretic layer 102, and corresponds to, for example, a polyethylene terephthalate film. The film 103*a* is transparent and has an insulation property. The common electrode layer 103*b* is configured with a transparent conducting layer, for example, an Indium Tin Oxide (ITO) film.

Figure 3:
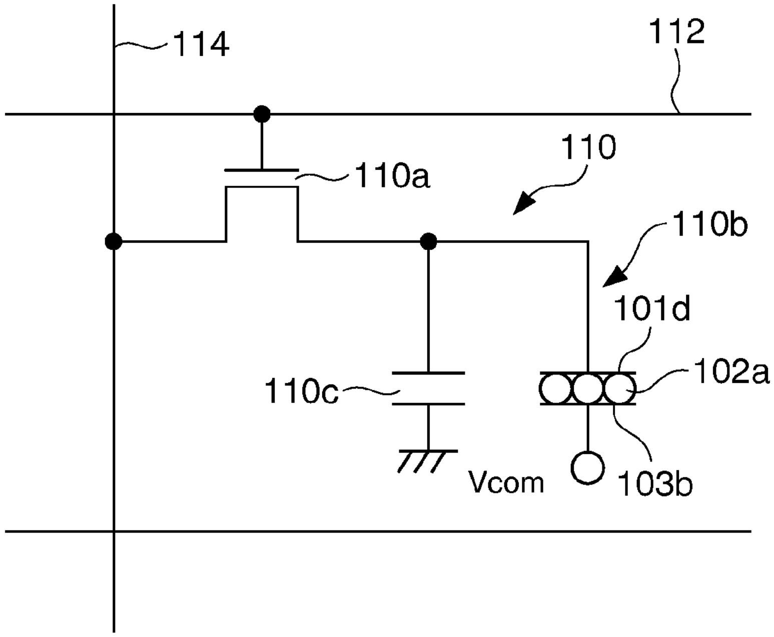
FIG. 3 is a view illustrating the equivalent circuit of a pixel.

FIG. 3 is a view illustrating the equivalent circuit of the pixel 110. Meanwhile, in the present embodiment, there is a case where the scanning lines 112 shown in FIG. 1 are sequentially called a first, a second, a third, . . . , an (m−1)-th, and an m-th row from the top in order to distinguish from each of the scanning lines 112. Further, in a similar way, there is a case where the data lines 114 shown in FIG. 1 are sequentially called a first, a second, a third, . . . , an (n−1)-th, and an n-th column from the left in order to distinguish from each of the data lines 114.

FIG. 3 illustrates the equivalent circuit of the pixel 110 corresponding to the intersection of an i-th row scanning line 112 and a j-th column the data line 114. Since the configuration of the pixel 110 corresponding to the intersection of another data line 114 and another scanning line 112 is the same as the configuration shown in the drawing, the equivalent circuit of the pixel 110 corresponding to the intersection of the i-th row scanning line 112 and the j-th column data line 114 will be described here as a representative, and the description of the equivalent circuit of another pixel 110 is omitted.

As shown in FIG. 3, each pixel 110 includes an n-channel type thin film transistor 110*a* (hereinafter, simply abbreviated to "TFT"), a display element 110*b*, and an auxiliary capacity 110*c*. In the pixel 110, the gate electrode of the TFT 110*a* is connected to the i-th row scanning line 112, the source electrode thereof is connected to the j-th column data line 114, and the drain electrode thereof is connected to the pixel electrode 101*d*, which is one end of the display element 110*b*, and one end of the auxiliary capacity 110*c*. The auxiliary capacity 110*c* is configured to interpose a dielectric layer using a pair of electrodes formed in the circuit layer 101*c*. The electrode of another end of the auxiliary capacity 110*c* receives a voltage which is common across each pixel. The pixel electrode 101*d* faces the common electrode layer 103*b*, and the electrophoretic layer 102 is interposed between the pixel electrode 101*d* and the common electrode layer 103*b*. Therefore, when viewed from the equivalent circuit, the display element 110*b* is the capacity which interposes the electrophoretic layer 102 using the pixel electrode 101*d* and the common electrode layer 103*b*. Further, the display element 110*b* maintains (stores) the voltage between both electrodes, and performs display along the direction of the electric field which occurs due to the maintained voltage. Meanwhile, in the present embodiment, a common voltage Vcom is applied as the voltage of the electrode of another end of the auxiliary capacity 110*c* of each pixel 110 and the voltage of the common electrode layer 103*b* using an external circuit which is not shown.

Returning to FIG. 1, the scanning line driving circuit 130 is connected to each of the scanning lines 112 of the display region 100. Under the control of the controller 5, the scanning line driving circuit 130 selects the scanning lines 112 in the order of a first, a second, . . . , and an m-th row, supplies a high level signal to a selected scanning line 112, and supplies low level signals to other scanning lines 112 which are not selected.

The data line driving circuit 140 is connected to each of the data lines 114 of the display region, and supplies a data signal to the data lines 114 of the respective columns based on display content corresponding to a single row of pixels 110 connected to the selected scanning line 112.

In a period from when the scanning line driving circuit 130 selects the first row scanning line 112 and to when the selection of the m-th row scanning line 112 is terminated (hereinafter, called “frame period” or simply “frame”), each scanning line 112 is selected once, and a data signal is supplied to each pixel 110 once a frame.

When the scanning line 112 is at a high level, the TFT 110*a*, the gate of which is connected to the corresponding scanning line 112, becomes an on state and the pixel electrode 101*d* is connected to the data line 114. If the data signal is supplied to the data line 114 when the scanning line 112 is at the high level, the corresponding data signal is applied to the pixel electrode 101*d* via the TFT 110*a* which becomes the on state. When the scanning line 112 becomes the low level, the TFT 110*a* becomes an off state. However, a voltage, applied to the pixel electrode 101*d* in response to the data signal, is accumulated in the auxiliary capacity 110*c*, and the electrophoretic particles move based on the electrical potential difference (voltage) of the electrical potential of the pixel electrode 101*d* and the electrical potential of the common electrode layer 103*b*.

For example, when the electrical potential of the pixel electrode 101*d* against the electrical potential Vcom of the common electrode layer 103*b* is +15V, the negatively-charged white electrophoretic particles move to the side of the pixel electrode 101*d* and the positively-charged black electrophoretic particles move to the side of the common electrode layer 103*b*, so that the pixel 110 is displayed in black. Further, when the electrical potential of the pixel electrode 101*d* against the electrical potential Vcom of the common electrode layer 103*b* is −15V, the positively-charged black electrophoretic particles move to the side of the pixel electrode 101*d* and the negatively-charged white electrophoretic particles move to the side of the common electrode layer 103*b*, so that the pixel 110 is displayed in white.

Meanwhile, in the present embodiment, when the display state of each pixel 110 is changed from white (low concentration) to black (high concentration) or changed from black to white, the display state is not changed by supplying the data signal to the pixel 110 during only a single frame but the display state is changed by performing a writing operation of supplying the data signal to the pixel 110 over a plurality of frames. The reason for this is that when the display state is changed from white to black, even though the electrical potential difference is applied to the electrophoretic particles for only a single frame, the black electrophoretic particles do not completely move to a display side, so that the display state does not become complete black. This is the same as in the white electrophoretic particles when the display state is changed from black to white. Therefore, for example, when the display state of the pixel 110 is changed from white to black, a data signal used to display black in the pixel 110 is supplied to the pixel 110 over a plurality of frames. When the display state of the pixel 110 is changed from black to white, the data signal used to display white in the pixel 110 is supplied to the pixel 110 over the plurality of frames.

Further, in the present embodiment, it is possible to set the pixel electrode 101*d* of a specific pixel 110 to a positive electrode in which electrical potential is high with respect to the common electrode layer 103*b* within a single frame, and to set the pixel electrode 101*d* of another pixel 110 to a negative electrode in which electrical potential is low with respect to the common electrode layer 103*b* within the same frame. That is, driving (hereinafter, called “bipolar driving”) capable of selecting both electrodes, including the positive electrode and the negative electrode, is performed with respect to the common electrode layer 103*b* in a single frame. In more detail, it is assumed that the pixel electrode 101*d* of the pixel 110, which causes the grayscale to be changed to a high concentration side, is the positive electrode and the pixel electrode 101*d* of the pixel 110, which causes the grayscale to be changed to a low concentration side, is the negative electrode in the single frame. Meanwhile, when the black electrophoretic particles are negatively charged and the white electrophoretic particles are positively charged, it is preferable that the pixel electrode 101*d* of the pixel 110, which causes the grayscale to be changed to the high concentration side be the negative electrode and the pixel electrode 101*d* of the pixel 110, which causes the grayscale to be changed to the low concentration side be the positive electrode.

Figure 4:
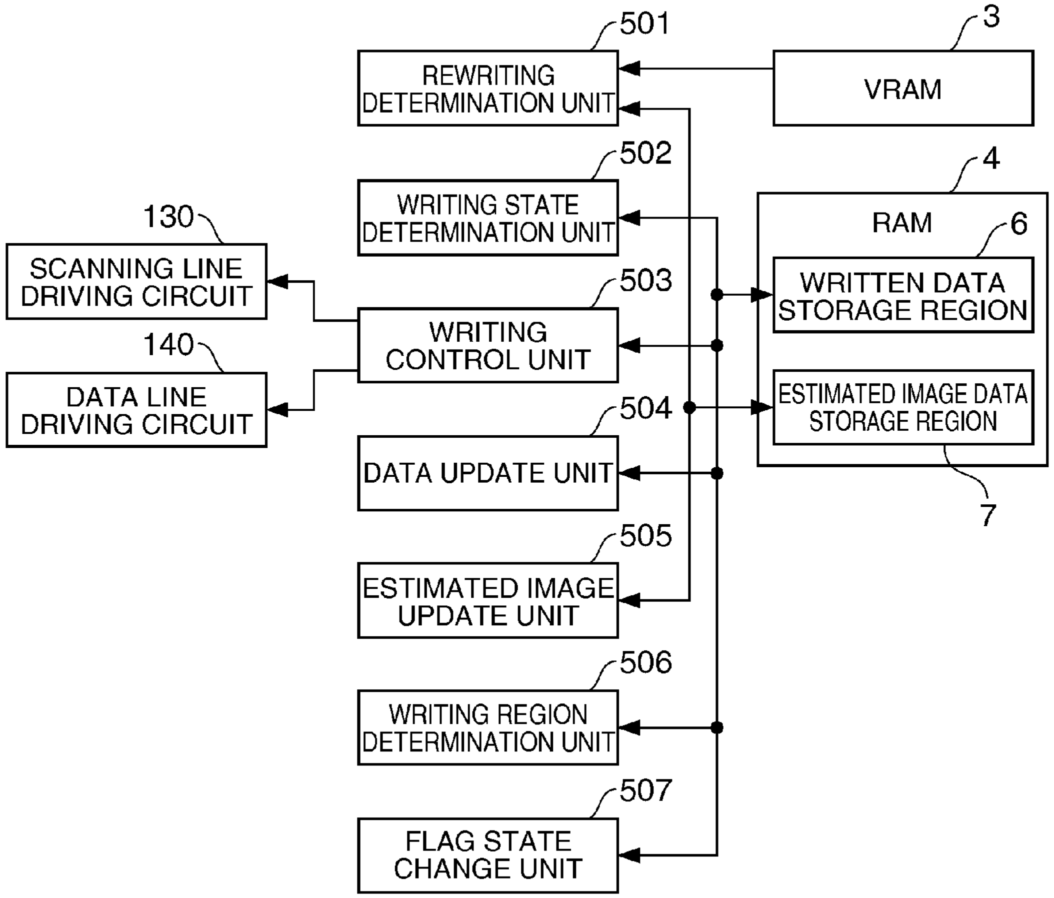
FIG. 4 is a block diagram illustrating a functional configuration implemented using a controller.

Next, the configuration of the controller 5 will be described. FIG. 4 is a block diagram illustrating functions implemented in the controller 5. In the controller 5, a rewriting determination unit 501, a writing state determination unit 502, a writing control unit 503, a data update unit 504, an estimated image update unit 505, a writing region determination unit 506, and a flag state change unit 507 are implemented. Meanwhile, each of these blocks may be implemented by hardware, and each block may be implemented by providing a CPU to the controller 5 and executing a program using the CPU.

The rewriting determination unit 501 is a block which compares the image data stored in the VRAM 3 with the image data stored in the estimated image data storage region 7, and determines whether both image data are different from each other or not. The writing state determination unit 502 is a block which determines whether a rewriting operation (writing operation) of changing the pixel from black to white or from white to black, is in progress or not with reference to the data stored in the written data storage region 6. Meanwhile, the written data storage region 6 includes a white written data storage region 6A which stores data (first written data) indicative of whether an operation of changing the display state of each pixel from black to white is in progress or not, and a black written data storage region 6B which stores data (second written data) indicative of whether an operation of changing the display state of each pixel from white to black is in progress or not. Further, the written data storage region 6 includes a flag storage region 6C for each row of the pixels 110 in m rows×n columns. The flag storage region 6C includes a storage region for each row of the pixels 110 in m rows×n columns. Each storage region stores an access flag indicative of whether a pixel 110, in which it is necessary to generate electrical potential difference between the pixel electrode 101*d* and the common electrode layer 103*b*, exists (indicative of whether the writing operation is performed or not).

The writing control unit 503 is a block which controls the scanning line driving circuit 130 and the data line driving circuit 140 such that the data signal is supplied to the pixel electrode 101*d*. The data update unit 504 is a block which writes data in the white written data storage region 6A and the black written data storage region 6B. The estimated image update unit 505 is a block which overwrites the image data stored in the estimated image data storage region 7 with the image data stored in the VRAM 3. The writing region determination unit 506 is a block which obtains the access flag from the RAM 4 (storage unit), and determines whether to perform the rewriting operation on the pixels included in a row (region) corresponding to the access flag. The flag state change unit 507 is a block which changes the access flag corresponding to the relevant region to 0 when the rewriting operation of all the pixels included in the row (region) corresponding to the access flag is terminated.

Next, the operation of the display apparatus 1000 will be described with reference to FIGS. 5 to 22. Meanwhile, an image A is indicative of an image which is displayed on the display region 100 in FIGS. 7 to 22. Further, a pixel Pij is indicative of a single pixel 110. Here, a subscript "i" is indicative of the row number of the pixel 110 arranged in the matrix, and "j" is indicative of a column number. Hereinafter, when description is made by specifying the pixel 110, for example, the pixel 110 in the first row and the first column is called a pixel P11. Meanwhile, although an 8-level grayscale from black to white is shown using numbers from 0 to 7 for each pixel 110 in the image A such that the grayscale can be easily understood, these numbers are not actually shown. Further, although the pixels 110 exist in the m rows and the n columns in the display region 100, the pixels 110 are arranged in 4 rows and 4 columns in FIGS. 7 to 22 in order to prevent the drawing from being complicated, so that pixels P11 to P44 in 4 rows and 4 columns are shown in the drawing.

Further, FIGS. 7 to 22 show the content of a storage region Aij corresponding to the pixels P11 to P44 in the VRAM 3, the content of a storage region Bij corresponding to the pixels P11 to P44 in the estimated image data storage region 7, the content of a storage region Cij corresponding to the pixels P11 to P44 in the white written data storage region 6A, the content of a storage region Dij corresponding to the pixels P11 to P44 in the black written data storage region 6B, and the content of a storage region Ei corresponding to the first row to fourth row of the flag storage region 6C. Meanwhile, the subscript i of each storage region indicates the row number of the storage region arranged in the matrix, and j indicates a column number. For example, when the storage region is specified and then described, for example, a storage region Aij in the first row and the first column is called a storage region A11.

The grayscale of each pixel of an image to be displayed on the display region 100 is stored in the storage regions A11 to A44 of the VRAM 3, and the grayscale of each pixel of the image to be displayed on the display region 100 is stored in the storage regions B11 to B44 of the estimated image data storage region 7. The number of applications of a voltage, which is necessary until the pixels P11 to P44 become white, is stored as first written data in the storage regions C11 to C44 of the white written data storage region 6A. The number of applications of a voltage, which is necessary until the pixels P11 to P44 become black, is stored as second written data in the storage regions D11 to D44 of the black written data storage region 6B. Meanwhile, if the first written data and the second written data do not correspond to 0, it is indicated that the rewriting operation performed on the pixels is in progress. If the first written data and the second written data correspond to 0, it is indicated that the rewriting operation performed on the pixels is terminated.

Further, the access flag indicative of whether a pixel 110, in which it is necessary to generate electrical potential difference between the pixel electrode 101*d* and the common electrode layer 103*b*, exists in each row of the pixels 110, is stored in the storage regions E1 to E4 of the flag storage region 6C. For example, when the pixel 110, in which it is necessary to generate the electrical potential difference between the pixel electrode 101*d* and the common electrode layer 103*b*, exists in the first row pixels 110 in order to change the display state of the pixel 110, the content of the access flag stored in the storage region E1 is 1, and when there is not the pixel 110 in which it is necessary to generate the electrical potential difference, the content of the access flag stored in the storage region E1 is 0.

Figure 5:
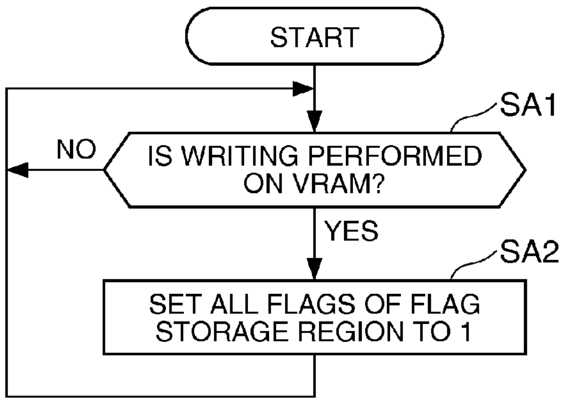
FIG. 5 is a flowchart illustrating the flow of a process performed by the controller.
Figure 6:
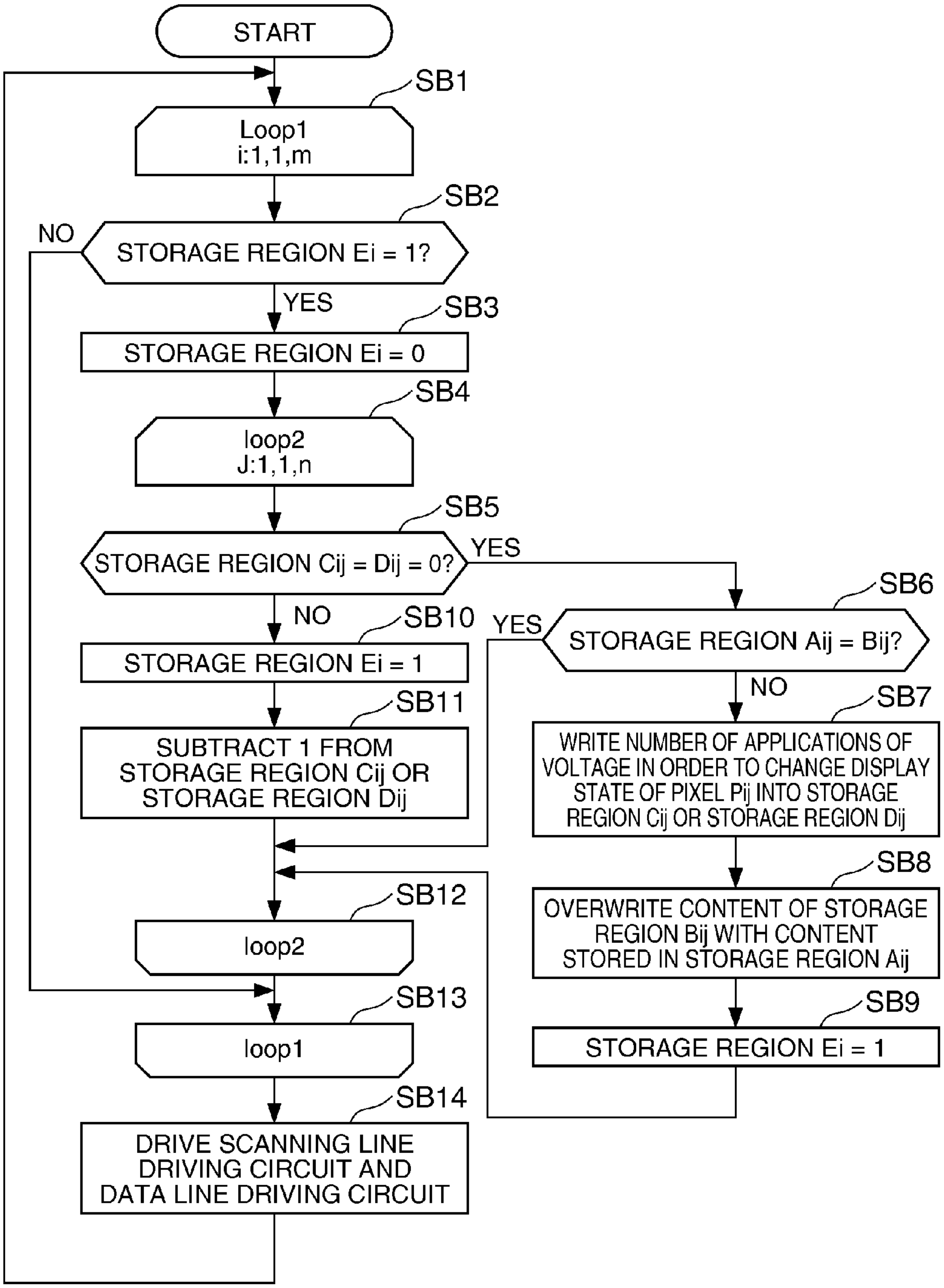
FIG. 6 is a flowchart illustrating the flow of a process performed by the controller.

FIGS. 5 and 6 are flowcharts illustrating the flow of the process performed by the controller 5. As shown in FIG. 5, the controller 5 monitors the writing of the image data from the control unit 2 to the VRAM 3. When the image data is written in the VRAM 3 (YES in step SA1), the content of the access flag is set to 1 with respect to the entire regions of the storage region Ei (step SA2).

Further, the controller 5 performs the process shown in FIG. 6 in addition to the process of FIG. 5. First, the controller 5 initializes the value of a variable i, which increases in the repetition process of a loop 1, as 1 (step SB1). Meanwhile, the repetition process of the loop 1 is repeated as the same number of scanning lines 112 (m lines). Next, the controller 5 determines whether the access flag stored in the storage region Ei, which is specified using the variable i, is 1. Here, when the access flag of the storage region Ei is 0 (NO in step SB2), the repetition process of a loop 2 is not performed, 1 is added to the variable i, and then the process in step SB2 is performed again.

Meanwhile, when the access flag of the storage region Ei is 1 (YES in step SB2), the controller 5 sets the access flag of the storage region Ei to 0 (step SB3). Next, the controller 5 initializes the value of a variable j, which increases in the repetition process of the loop 2, as 1 (step SB4), and determines whether both the first written data of the storage region Cij and the second written data of the storage region Dij correspond to 0 (step SB5). Meanwhile, the repetition process of the loop 2 is repeated as the same number of data lines 114 (n lines). When both the first written data of the storage region Cij and the second written data of the storage region Dij correspond to 0 (YES in step SB5), the controller 5 proceeds to step SB6. When one of the first written data and the second written data is not 0 (NO in step SB5), the controller 5 proceeds to step SB10.

When it is determined to be NO in step SB5, the controller 5 sets the access flag of the storage region Ei to 1 (step SB10). Further, the controller 5 subtracts 1 from data which is not 0 of the first written data stored in the storage region Cij and the second written data stored in the storage region Dij (step SB11). Meanwhile, 1 is not subtracted from the first written data and the second written data, the value of which is 0.

Further, when it is determined to be YES in step SB5, the controller 5 compares data stored in the storage region Aij with data stored in the storage region Bij. Here, when both data are different from each other (NO in step SB6), the controller 5 specifies the pixel Pij as a pixel, the display state of which is newly changed, and updates data related to the specified pixel Pij. In detail, the controller 5 writes the number of applications of the voltage to pixels, which are necessary until the grayscale of the pixel Pij is changed to the grayscale of the storage region Aij, in the written data storage region 6 (step SB7). Further, the controller 5 overwrites the content of the storage region Bij with content stored in the storage region Aij (step SB8), and sets the access flag of the storage region Ei to 1 (step SB9).

The controller 5 determines whether the value of the variable j is n (the number of data lines 114) in step SB12. Here, when the value of the variable j is less than n, the flow of the process returns to step SB4 and 1 is added to the variable j. When the value of the variable j is n in step SB12, the controller 5 terminates the process of the loop 2, and determines whether the value of the variable i is m (the number of scanning lines 112) in step SB13. When the value of the variable i is less than m, the controller 5 returns the flow of the process to step SB1 and adds 1 to the variable i.

When the value of the variable i is m, the controller 5 terminates the process of the loop 1, controls the scanning line driving circuit 130 and the data line driving circuit 140, and supplies the data signal to all the pixels 110 (step SB14). When the process of step SB14 is terminated, the controller 5 returns the flow of the process to step SB1.

Next, the variation in display of the display region 100, the variation in the content of the VRAM 3, the variation in the content of the estimated image data storage region 7, and the variation in the content of the written data storage region 6 from when the image data is written in the VRAM 3 to when the image of the image data is displayed on the display region 100 will be described with reference to FIGS. 7 to 22.

Figure 7:
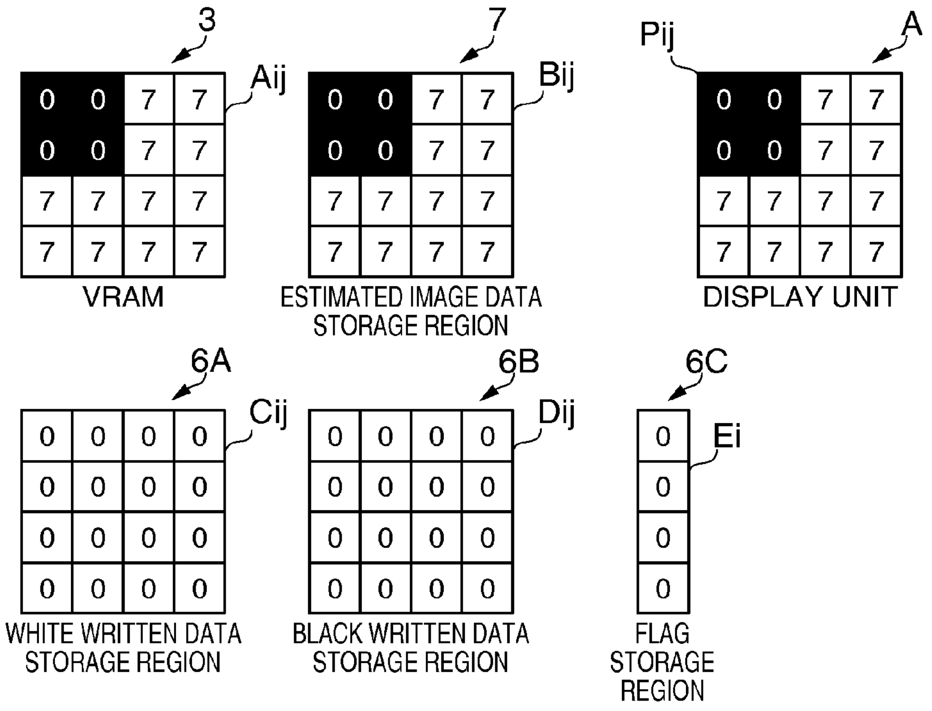
FIG. 7 is a view illustrating the operation of the electro-optic apparatus.
Figure 8:
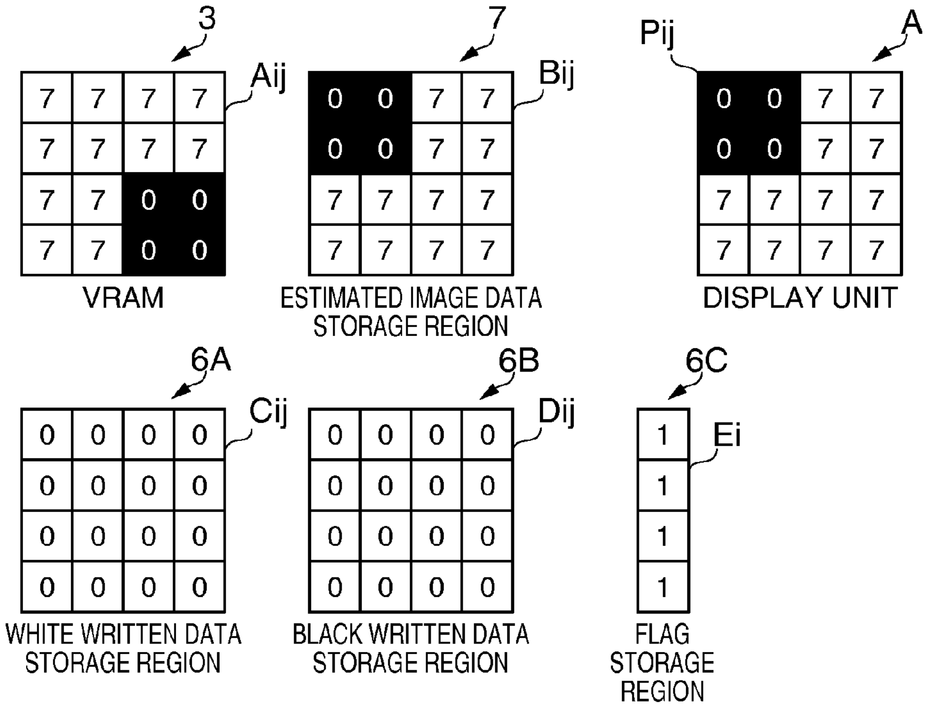
FIG. 8 is a view illustrating the operation of the electro-optic apparatus.
Figure 9:
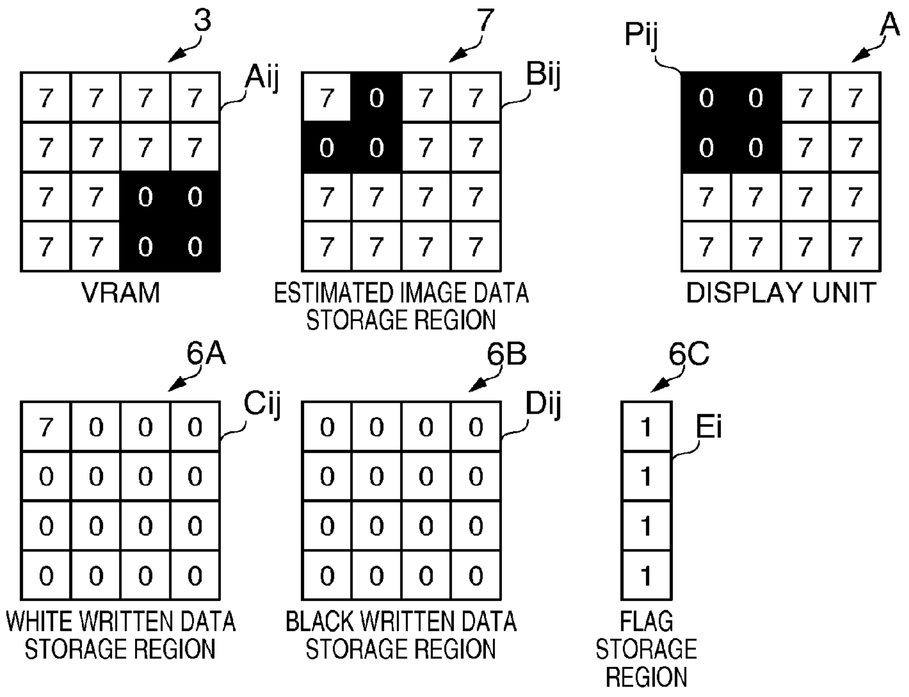
FIG. 9 is a view illustrating the operation of the electro-optic apparatus.
Figure 10:
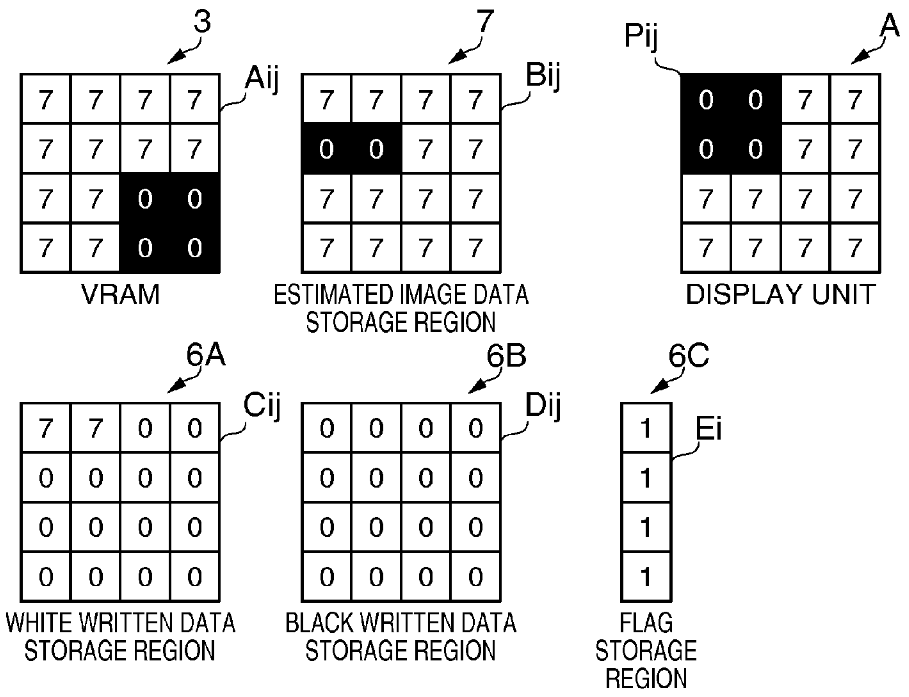
FIG. 10 is a view illustrating the operation of the electro-optic apparatus.

If the control unit 2 writes the image data in the VRAM 3 when the display of the display region 100 and the states of the VRAM 3, the written data storage region 6 and the estimated image data storage region 7 correspond to the states shown in FIG. 7, the state of the VRAM 3 corresponds to the state shown in FIG. 8 based on the image data and the state of the flag storage region 6C corresponds to the state shown in FIG. 8 based on the process shown in FIG. 5. Here, if the variable i is 1 based on the process in step SB1 of FIG. 6, the access flag of the storage region E1 is 1, so that it is determined to be YES in step SB2 and the access flag of the storage region E1 is 0 in step SB3. Next, when the variable i and the variable j are 1 in the state shown in FIG. 8, it is determined to be YES in step SB5 and it is determined to be NO in step SB6. Since the content of the storage region B11 indicates black and the content of the storage region A11 indicates white, the pixel P11 is changed from black to white, 7 is written in the storage region C11 in step SB7, the content of the storage region A11 is written in the storage region B11 in step SB8, and the access flag of the storage region E1 becomes 1 in step SB9, thereby being the state shown in FIG. 9. Next, when the variable j becomes 2, it is determined to be YES in step SB5 and it is determined to be NO in step SB6. Therefore, the process of step SB7 to step SB9 is performed, thereby being the state shown in FIG. 10.

Figure 11:
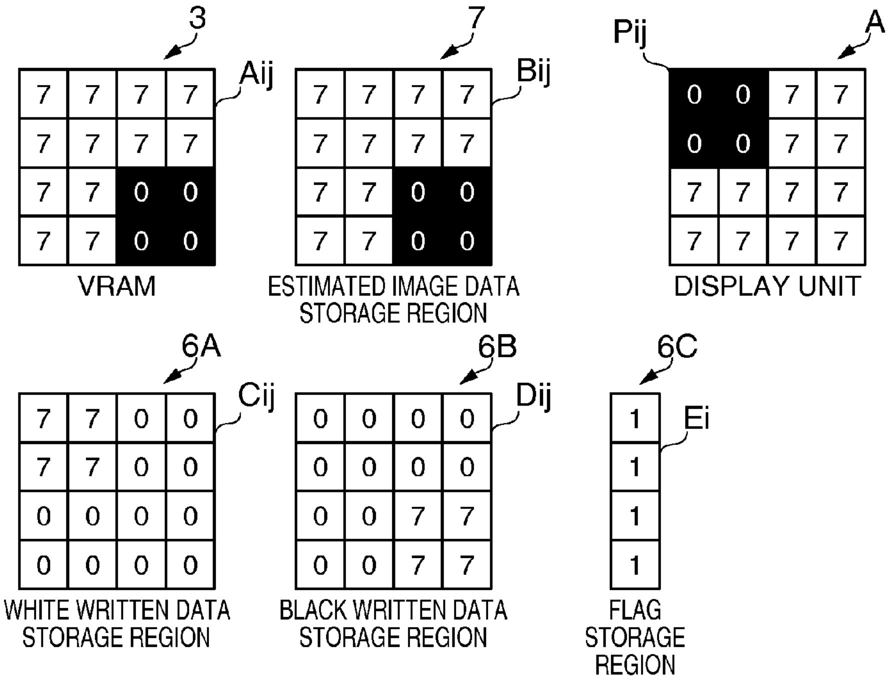
FIG. 11 is a view illustrating the operation of the electro-optic apparatus.
Figure 12:
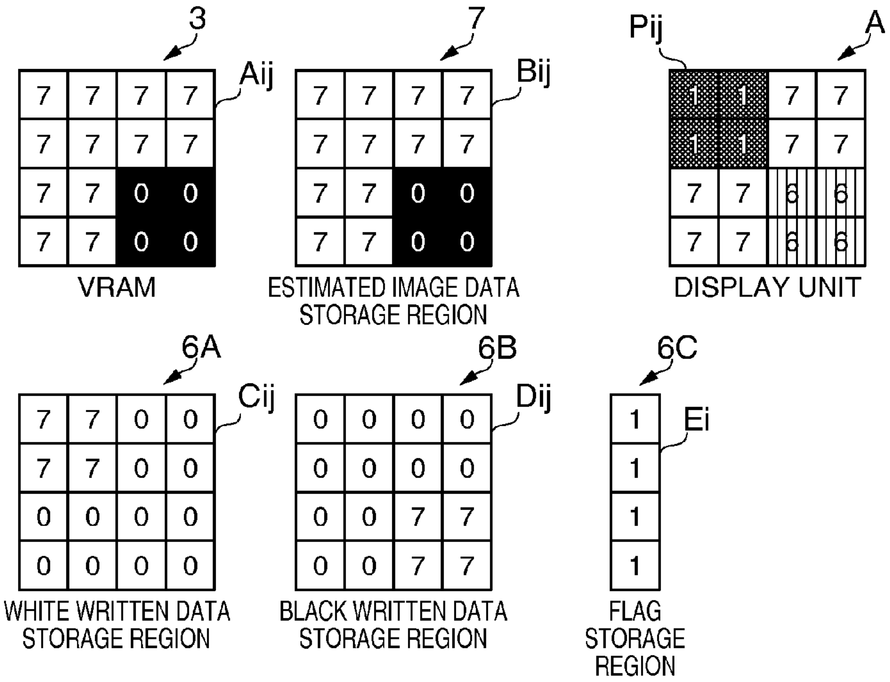
FIG. 12 is a view illustrating the operation of the electro-optic apparatus.

Thereafter, when the process shown in FIG. 6 proceeds and the variable i becomes 3 and the variable j becomes 3, it is determined to be YES in step SB5 and NO in step SB6. Since the content of the storage region B33 indicates white and the content of the storage region A11 indicates black, the pixel P11 is changed from white to black, 7 is written in the storage region D11 in step SB7, the content of the storage region A11 is written in the storage region B11 in step SB8, and the access flag of the storage region E3 becomes 1 in step SB9. Further, when each of the variable i and the variable j becomes 4, the content of the estimated image data storage region 7 becomes the same as the content of the VRAM 3 as shown in FIG. 11. Further, the state of the white written data storage region 6A is made such that 7 is written in each of the storage regions C11, C12, C21, and C22, and the state of the black written data storage region 6B is made such that 7 is written in each of the storage regions D33, D34, D43, and D44. Further, the access flag of each of the storage regions E1 to E4 becomes 1.

When the repetition process of the loop 1 is terminated, the process of step SB14 is performed. The controller 5 controls the data line driving circuit 140 with reference to the white written data storage region 6A and the black written data storage region 6B. When the controller 5 controls the scanning line driving circuit 130 and the data line driving circuit 140, for example, the content of the storage region C11 is not 0. Therefore, when the first row scanning line 112 is selected, a voltage is applied to the first column data line 114 such that the electrical potential of the pixel electrode 101*d* becomes −15V with respect to the electrical potential Vcom of the common electrode layer 103*b*. Further, since the content of the storage regions C12, C21, and C22 of the respective pixels P12, P21, and P22 is not 0, a voltage is applied to the data line 114 such that the electrical potential of the pixel electrode 101*d* becomes −15V with respect to the electrical potential Vcom of the common electrode layer 103*b* when the scanning line 112 is selected.

Further, since the content of the storage region D33 is not 0, a voltage is applied to the third column data line 114 such that the electrical potential of the pixel electrode 101*d* becomes +15V with respect to the electrical potential Vcom of the common electrode layer 103*b* when the third row scanning line 112 is selected. Further, since the content of the storage regions D34, D43, and D44 of the respective pixels P34, P43, and P44 is not 0, a voltage is applied to the data line 114 such that the electrical potential of the pixel electrode 101*d* becomes +15V with respect to the electrical potential Vcom of the common electrode layer 103*b* when the scanning line 112 is selected.

Meanwhile, in other pixels, the content of the corresponding storage region of the white written data storage region 6A is 0 and the content of the corresponding storage region of the black written data storage region 6B is 0. Therefore, a voltage is applied to the data line 114 such that the difference between the electrical potential of the pixel electrode 101*d* and the electrical potential Vcom of the common electrode layer 103*b* becomes 0V when the scanning line 112 is selected. When the voltage is applied to the data line 114 as described above, the white particles and black particles of the pixels move so that the display of the display region 100 becomes a state shown in FIG. 12.

When the process of step SB14 is terminated, the controller 5 returns the flow of the process to step SB1. When the variable i is 1 in step SB2 in the state of FIG. 12, it is determined to be YES in step SB2 and the access flag of the storage region E1 is set to 0 in step SB3. Next, when the variable i and the variable j are 1 in the state of FIG. 12, the storage region C11 is not 0. Therefore, it is determined to be NO in step SB5, and the access flag of the storage region E1 is set to 1 in step SB10. Next, 1 is subtracted from the value written in the storage region C11 in step SB11, so that the content of the storage region C11 becomes 6.

Next, when the variable j becomes 2, it is determined to be NO in step SB5. Thereafter, 1 is subtracted from the value written in the storage region C12, so that the content of the storage region C12 becomes 6. Thereafter, when selection is made to the pixel P44, the content of each of the storage regions C11, C12, C21, and C22 becomes 6 and the content of each of the storage regions D33, D34, D43, and D44 becomes 6 as shown in FIG. 13.

Figure 13:
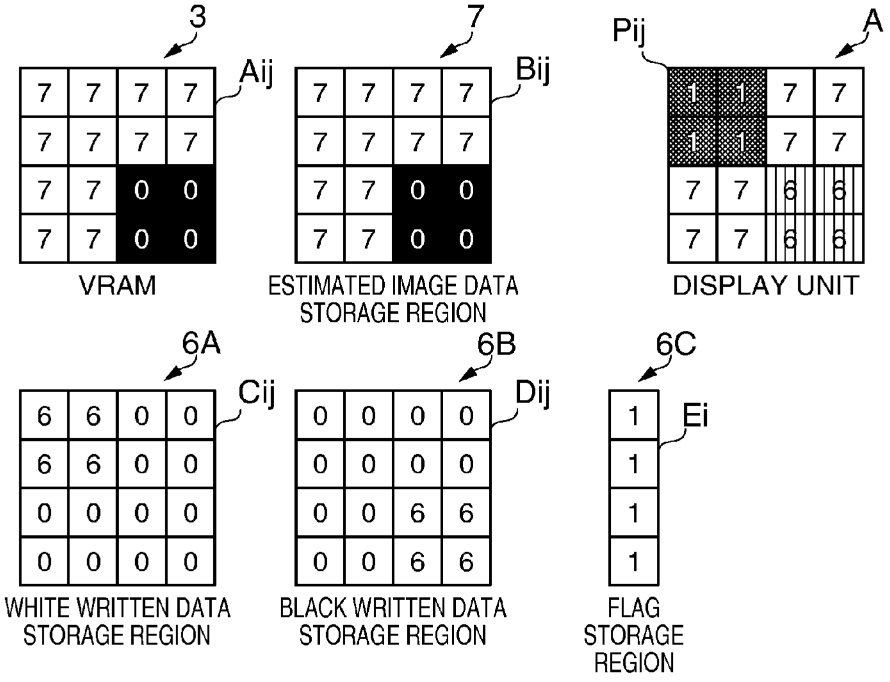
FIG. 13 is a view illustrating the operation of the electro-optic apparatus.
Figure 14:
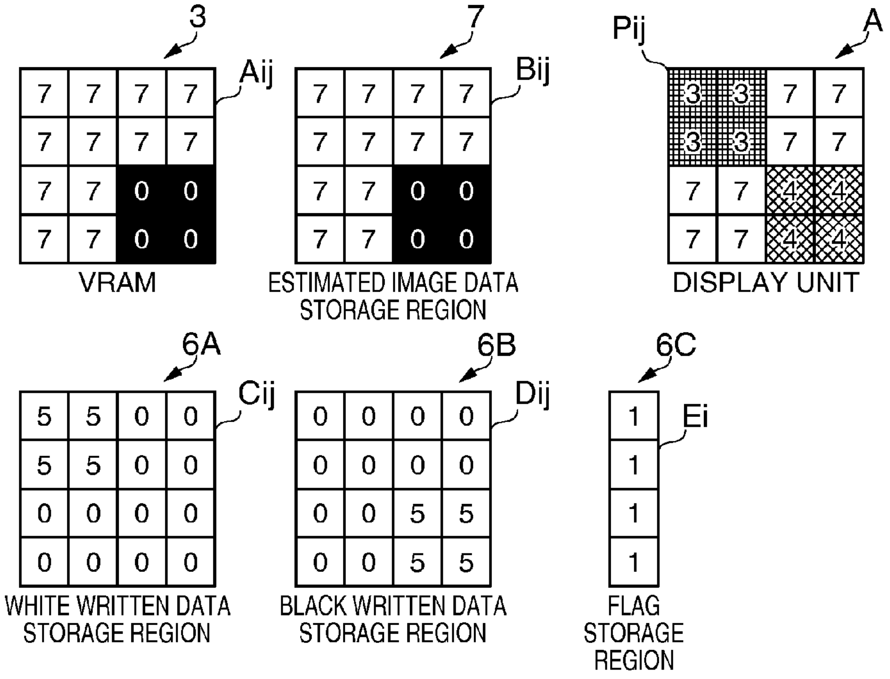
FIG. 14 is a view illustrating the operation of the electro-optic apparatus.
Figure 15:
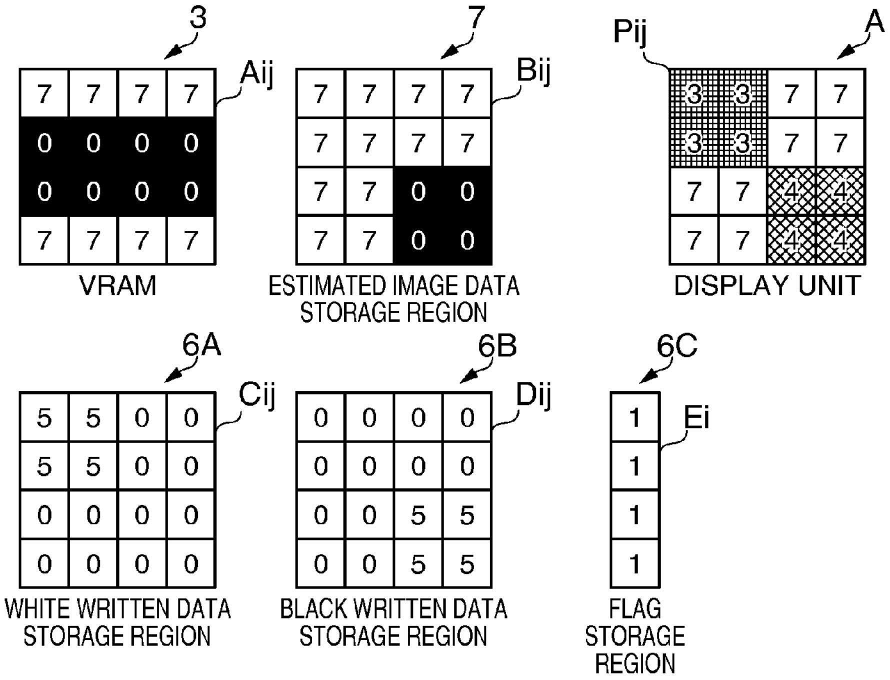
FIG. 15 is a view illustrating the operation of the electro-optic apparatus.

FIG. 14 is a view illustrating a state immediately after the second round of the process of step SB14 is performed from the state shown in FIG. 13. Here, the case where the content of the VRAM 3 is rewritten as shown in FIG. 15 will be considered. When the control unit 2 writes the image data in the VRAM 3, the access flags of all the flag storage regions 6C become 1, based on the process shown in FIG. 5. Next, when the variable i becomes 2 and the variable j becomes 1 in the state of FIG. 15, it is determined to be NO in step SB5 and 1 is subtracted from the value written in the storage region C21 in step SB11, so that the content of the storage region C21 becomes 4.

Meanwhile, when the variable i becomes 2 and the variable j becomes 3, it is determined to be YES in step SB5 and NO in step SB6. Since the content of the storage region B23 indicates white and the content of the storage region A23 indicates black, the pixel P23 is changed from white to black. Therefore, 7 is written in the storage region D23 in step SB7 and the content of the storage region A23 is written in the storage region B23 in step SB8.

As described above, even when the content of the VRAM is rewritten from white to black, white rewriting is proceeding on the pixel P21 on which white rewriting is in progress, and second written data is stored in the black written data storage region 6B with respect to the pixel P23 on which rewriting is not performed.

Further, when the variable i becomes 4 and the variable j becomes 3 in the state of FIG. 15, it is determined to be NO in step SB5 and 1 is subtracted from the value written in the storage region D43 in step SB11, so that the content of the storage region D43 becomes 4. As described above, even when the content of the VRAM 3 is rewritten from black to white, rewriting is proceeding on the pixel P43 on which black rewriting is in progress.

Figure 16:
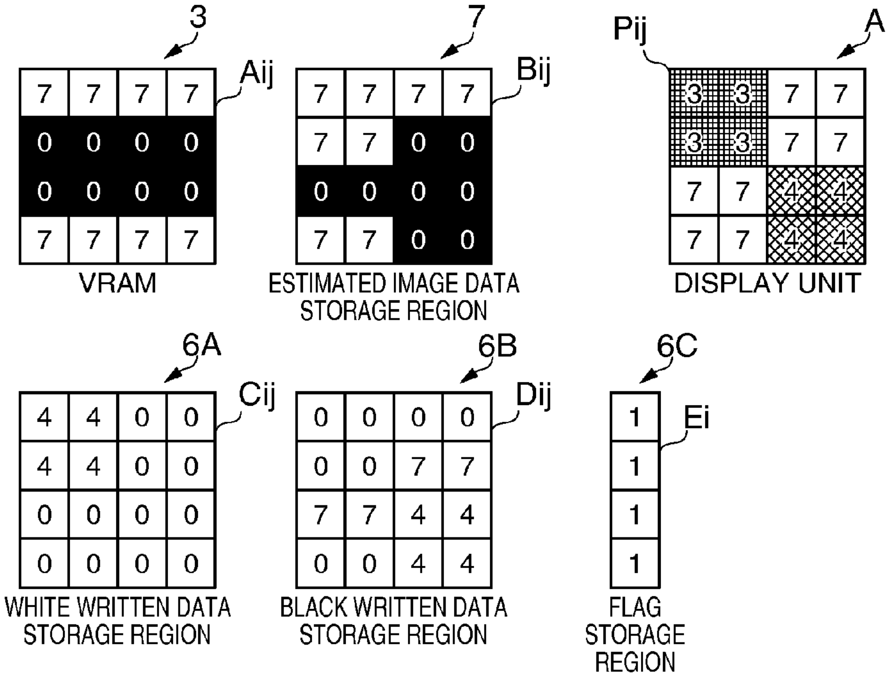
FIG. 16 is a view illustrating the operation of the electro-optic apparatus.
Figure 17:
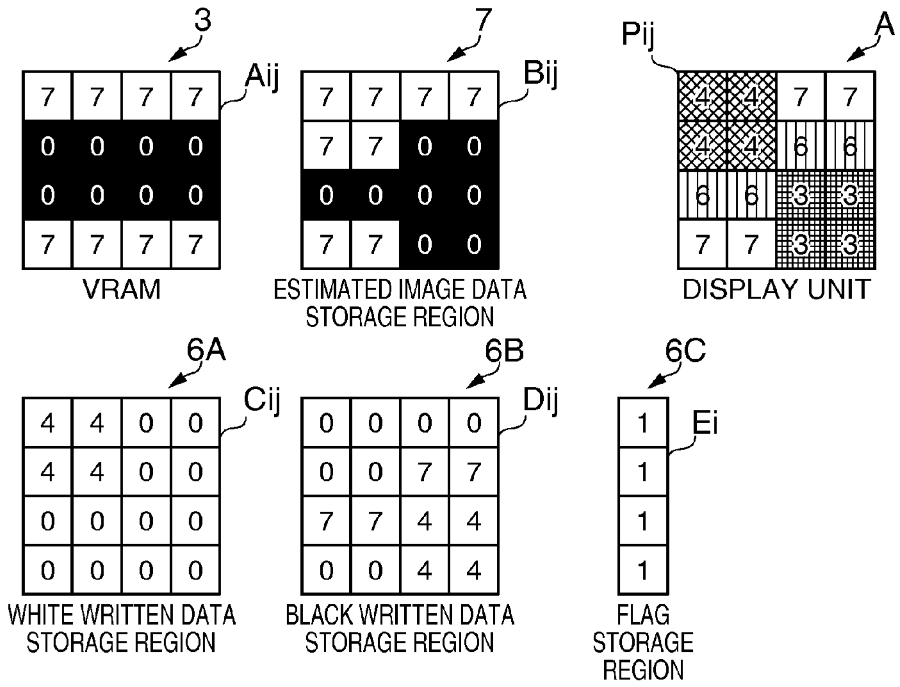
FIG. 17 is a view illustrating the operation of the electro-optic apparatus.

Thereafter, when the process of the loop 1 is terminated, the states of the VRAM 3 and each storage region correspond to the states shown in FIG. 16. Further, when the process of step SB14 is performed from the states shown in FIG. 16, the state of the display region 100 corresponds to the state shown in FIG. 17. With respect to pixels corresponding to a portion in which content is rewritten in the VRAM 3, rewriting in progress is performed on pixels which are being rewritten, and rewriting of pixels is newly started on the pixels which were not rewritten.

Figure 18:
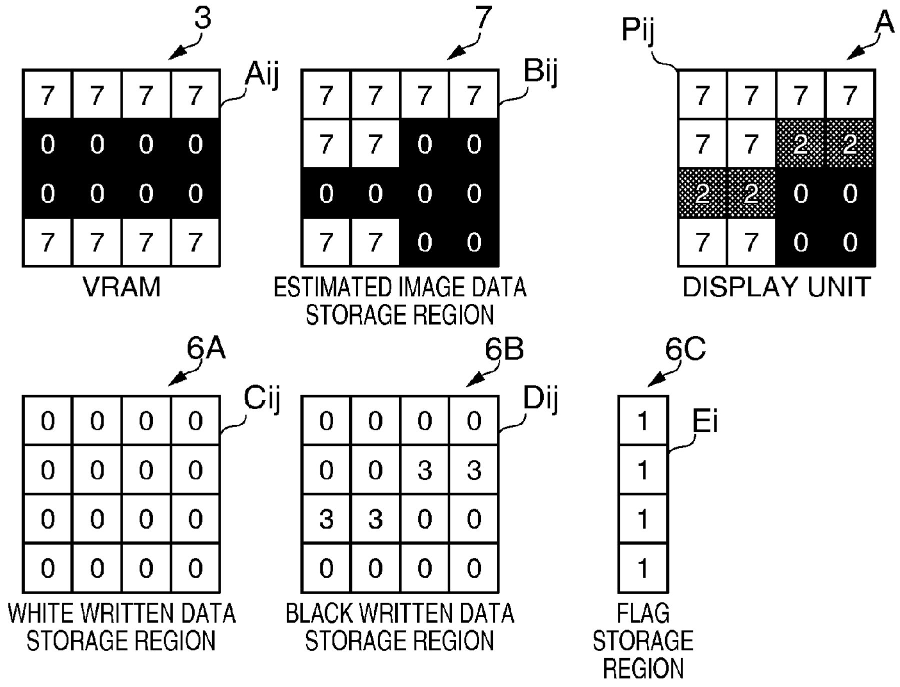
FIG. 18 is a view illustrating the operation of the electro-optic apparatus.
Figure 19:
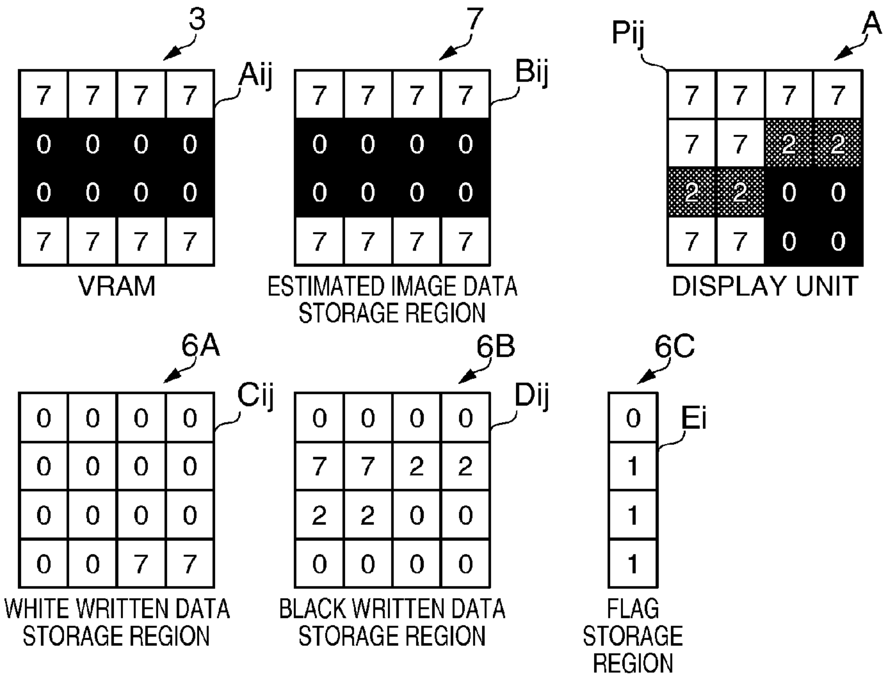
FIG. 19 is a view illustrating the operation of the electro-optic apparatus.
Figure 20:
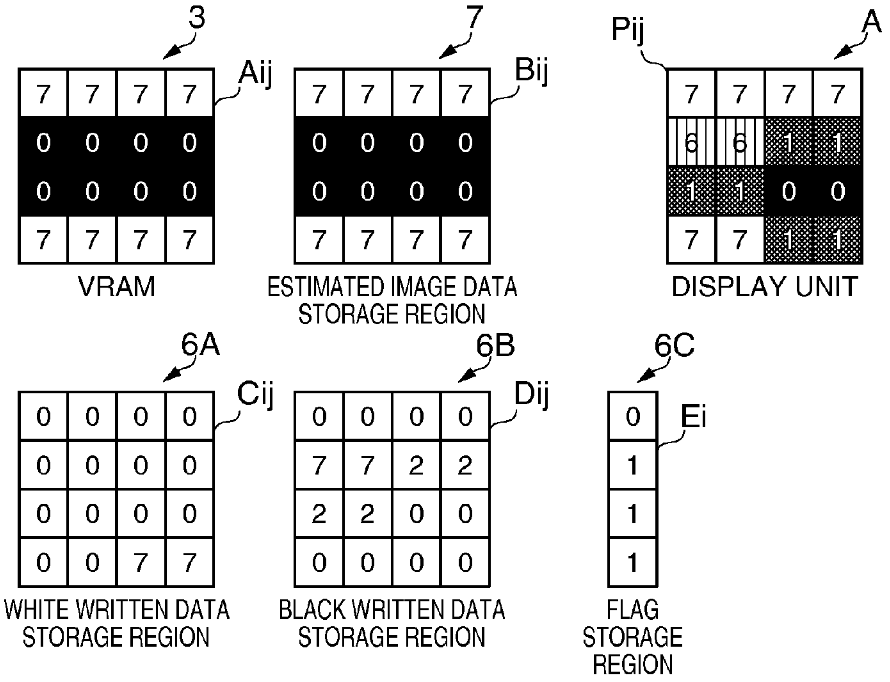
FIG. 20 is a view illustrating the operation of the electro-optic apparatus.

Further, when the process proceeds, the value of the first written data and the value of the second written data of a pixel, on which rewriting is started in advance, become 0, and the display of each of the storage regions and the display region 100 correspond to the states shown in FIG. 18. Thereafter, the flow of the process is returned to step SB1. When the variable i is 1, the access flag of the storage region E1 is set to 0 in step SB3. Further, if the process of the loop 2 is performed when the variable i is 1, the storage regions C11 to C14 and the storage regions D11 to D14 correspond to 0, and the storage regions A11 to A14 and the storage regions B11 to B14 have the same value. Therefore, it is determined to be YES in steps SB5 and SB6, and the storage region E1 remains 0.

Further, when the variable i becomes 2 and the variable j becomes 1, it is determined to be YES in step SB5 and NO in step SB6. Therefore, 7 is written in the storage region D21 in step SB7, the content of the storage region A21 is written in the storage region B21 in step SB8, and the access flag of the storage region E2 is set to 1 in step SB9. Further, when the variable i becomes 4 and the variable j becomes 1, it is determined to be YES in step SB5 and NO in step SB6. Therefore, 7 is written in the storage region C41 in step SB7, the content of the storage region A41 is written in the storage region B41 in step SB8, and the access flag of the storage region E4 is set to 1 in step SB9. Thereafter, if the process is performed until the process of the loop 1 is terminated, the content of each of the storage regions corresponds to the state shown in FIG. 19. If the process of step SB14 is performed, the content thereof corresponds to the state shown in FIG. 20.

Next, the flow of the process returns to step SB1. If the variable i is 1 in step SB2, the access flag of the storage region E1 is 0, so that it is determined to be NO in step SB2. If it is determined to be NO in step SB2, the value of the variable i increase by 1 without performing the process of the loop 2. Here, if the process of the loop 2 is not performed, the controller 5 does not access the VRAM 3 or the RAM 4 in order to perform determination in step SB5 and step SB6 with respect to each of the storage regions corresponding to the first row pixels 110. For example, in the case of a display region in which the number of pixel columns corresponds to several hundreds of columns, hundreds of accesses are not performed compared to the case in which the process of step SB2 is not performed, so that power consumption can be restricted.

Figure 21:
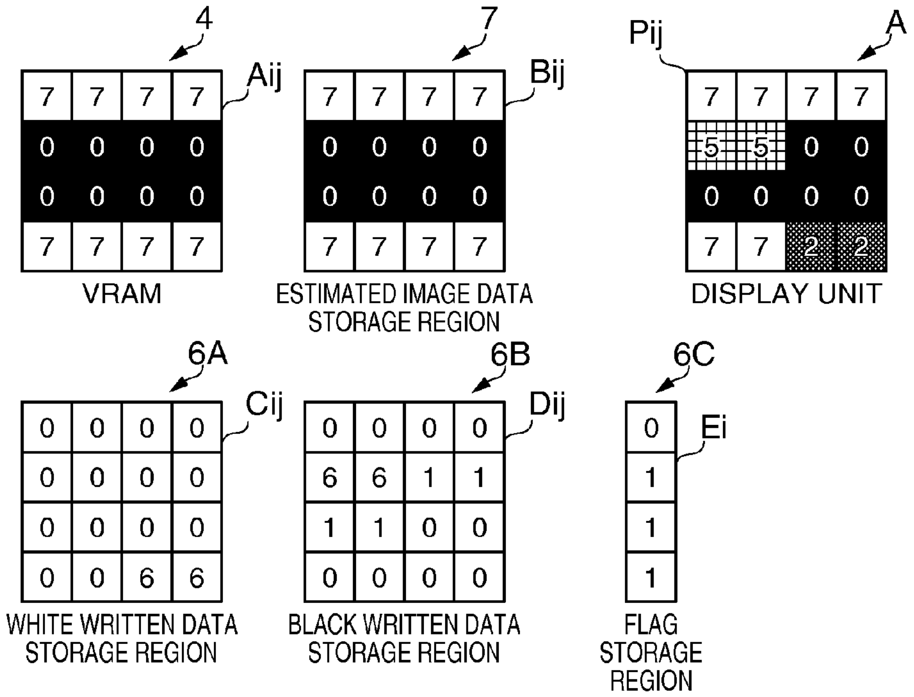
FIG. 21 is a view illustrating the operation of the electro-optic apparatus.
Figure 22:
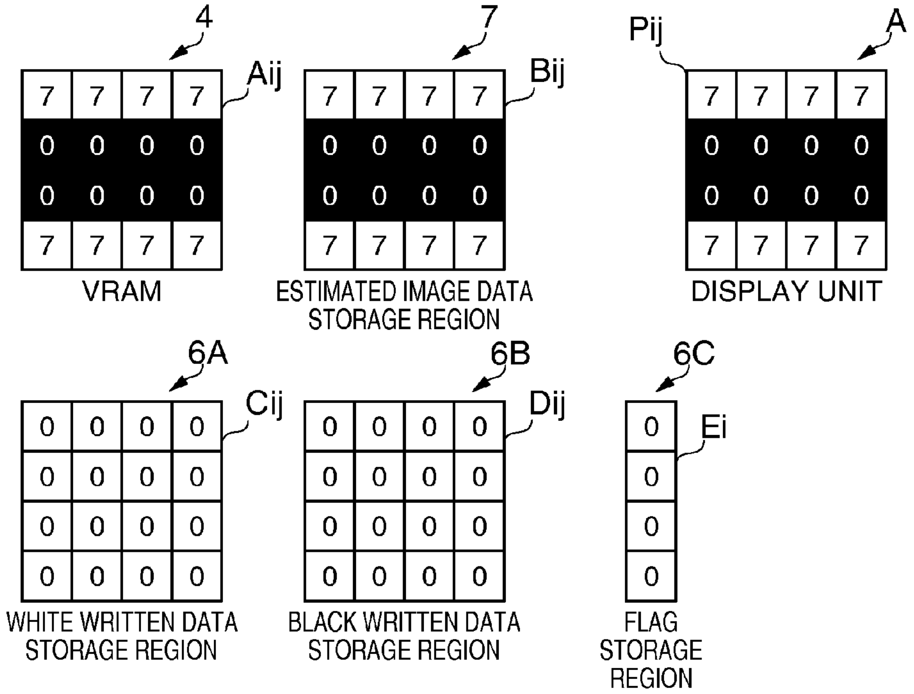
FIG. 22 is a view illustrating the operation of the electro-optic apparatus.

Thereafter, if the process proceeds, the content of each of the storage regions corresponds to the state of FIG. 21. Here, when the process of step SB14 is performed, the state of the display region 100 corresponds to the state shown in FIG. 21 and the rewriting of the pixels P23, P24, P31, and P32 is terminated. Further, when the process proceeds in addition, the rewriting of the pixels P21, P22, P43, and P44 proceeds, and finally results in the state shown in FIG. 22.

According to the present embodiment, even when a region on which rewriting is started first is overlapped with a region on which rewriting is newly performed, rewriting is immediately started on the portion where rewriting is not in progress when rewriting is newly started, so that a user feels that display speed is fast.

Further, according to the present embodiment, with respect to a row, the display of which is not changed when an image is rewritten, the storage region of the VRAM 3 or the RAM 4, which stores data relevant to the display of the corresponding row, is not accessed, so that power consumption can be restricted.

Electronic Apparatus

Figure 23:
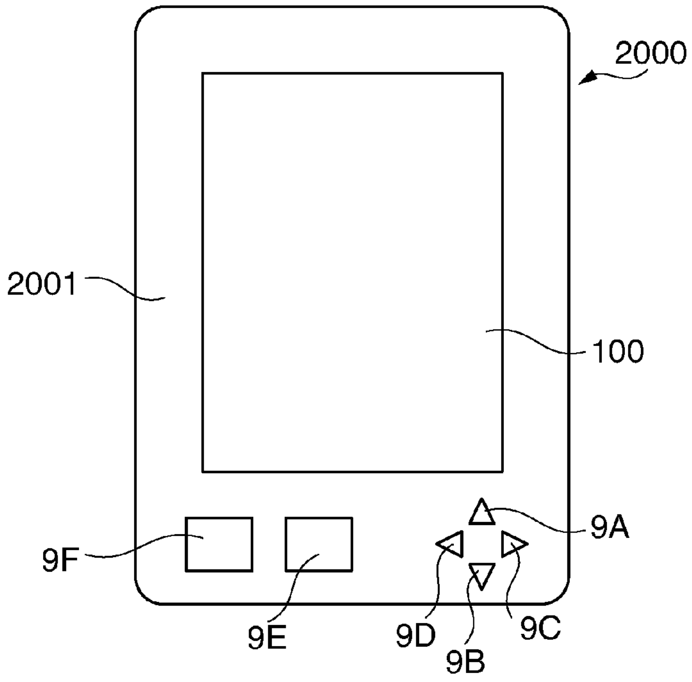
FIG. 23 is a view illustrating the appearance of an electronic book reader.

Next, an example of an electronic apparatus to which the electro-optic apparatus 1 according to the above-described embodiment is applied will be described. FIG. 23 is a view illustrating the appearance of an electronic book reader using the corresponding electro-optic apparatus 1. An electronic book reader 2000 includes a plate-shaped frame 2001, buttons 9A to 9F, the electro-optic apparatus 1 according to the above-described embodiment, a control unit 2, a VRAM 3, and a RAM 4. The display region 100 of the electronic book reader 2000 is exposed. In the electronic book reader 2000, the content of an electronic book is displayed on the display region 100, and the page of the electronic book is turned over by manipulating the buttons 9A to 9F.

Meanwhile, in addition, a clock, an electronic paper, an electronic organizer, an electronic calculator, or a mobile phone can be considered as an electronic apparatus to which the electro-optic apparatus 1 according to the above-described embodiment can be applied.

MODIFICATION EXAMPLE

Hereinbefore, although the embodiment of the invention has been described, the invention is not limited to the above-described embodiment and can be implemented in other various types of forms. For example, the invention may be implemented by modifying the above-described embodiment as below. Meanwhile, each of the above-described embodiment and the modification examples below may be combined.

In the embodiment of the invention, the flag storage region 6C may be referred to even when the data line driving circuit 140 is controlled in step SB14, and the white written data storage region 6A and the black written data storage region 6B may not be accessed when the access flag is 0. For example, when the access flag of the storage region E1 is 0, it is shown that the electrical potential difference is not generated between the pixel electrode 101*d* and the common electrode layer 103*b* of each of the first row pixels. Therefore, the white written data storage region 6A and the black written data storage region 6B are not accessed, and the data signal is supplied to each of the data lines 114 such that the electrical potential difference with the electrical potential Vcom of the common electrode layer 103*b* becomes 0V when the first row scanning line 112 is selected. According to this configuration, access to the RAM 4 decreases even when the data line driving circuit 140 is controlled, so that power consumption can be restricted.

In the embodiment of the invention, when the control unit 2 writes image data in the VRAM 3, a region, the display state of which is changed, may be notified to the controller 5, and the controller 5 may set the content of the access flag of the storage region Ei corresponding to the row of the pixels which are relevant to the notified region to 1.

Figure 24:
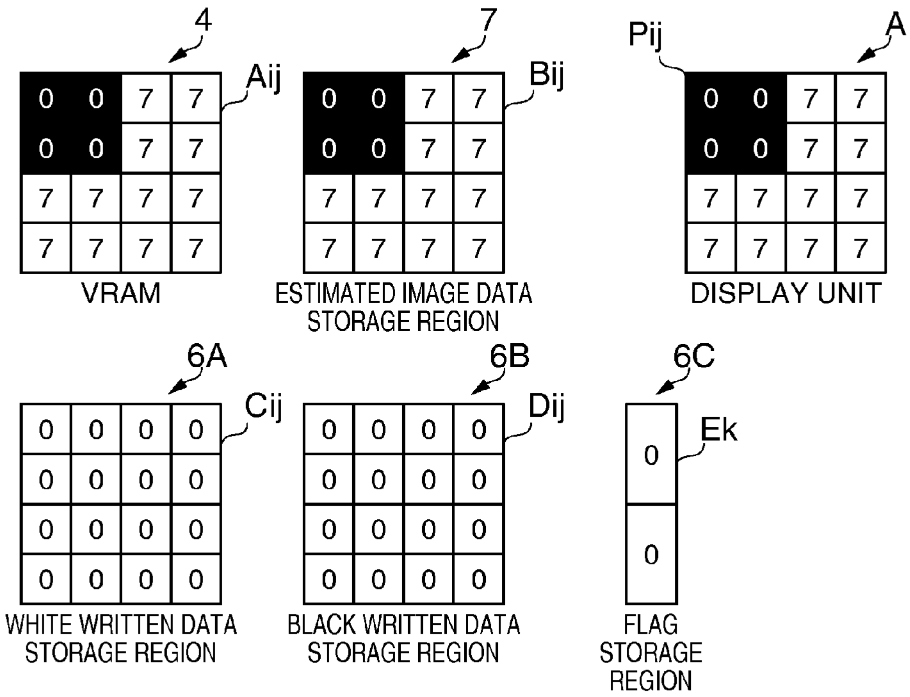
FIG. 24 is a view illustrating a flag storage region according to a modification example.

In the above-described embodiment, although the flag storage region 6C includes a storage region corresponding to each row of the pixels 110 in m rows×n columns, the configuration of the flag storage region 6C is not limited to this configuration. For example, as shown in FIG. 24, a storage region Ek may be provided for each of the plurality of rows of pixels 110 and the storage region Ek is provided in the flag storage region 6C such that a single storage region is provided for first and second rows, and a single storage region is provided for third and fourth rows. In the flag storage region 6C shown in FIG. 24, a storage region E1 corresponds to the first and second row pixels and a storage region E2 corresponds to the third and fourth row pixels.

Figure 25:
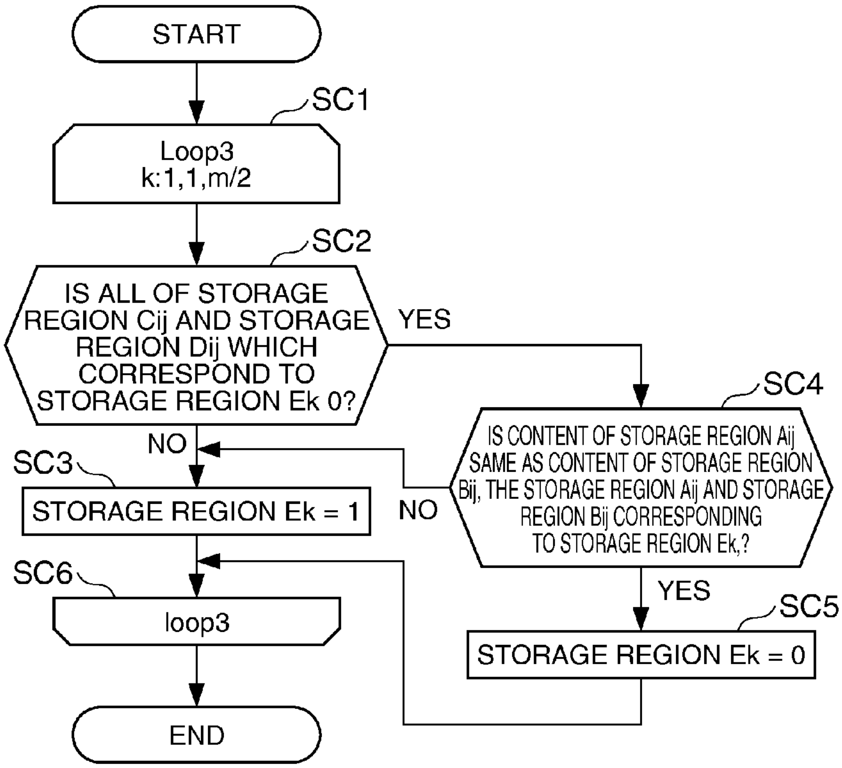
FIG. 25 is a flowchart illustrating the flow of a process performed by the controller in the modification example.

In this configuration, the processes of step SB2, step SB3, step SB9, and step SB10 are removed from the process shown in FIG. 6. Further, in order to update the content of the flag storage region 6C, a process shown in FIG. 25 is performed before the process of step SB14 is performed, thereby updating the data of each storage region of the flag storage region 6C. In step SB14, the flag storage region 6C is referred to even when the scanning line driving circuit 130 and the data line driving circuit 140 are controlled as in the above-described modification example. When the access flag is 0, the white written data storage region 6A and the black written data storage region 6B are not accessed.

In the process of FIG. 25, a variable k is added by performing the process of a loop 3. Thereafter, when all the storage region Cij and the storage region Dij which correspond to the storage region Ek are not 0 (NO in step SC2), the access flag of the storage region Ek is set to 0. For example, when k=1 and when any one of the values of the storage regions C11 to C14, the storage regions C21 to C24, the storage regions D11 to D14 and the storage regions D21 to D24 is not 0, the access flag of the storage region E1 is set to 1. Further, if it is determined to be YES in step SC2 and the content of the storage region Cij and the storage region Dij which correspond to the storage region Ek is the same (YES in step SC4), the access flag of the storage region Ek is set to 0. For example, when k=1 and when the content of each of the storage regions A11 to A14 is the same as the content of each of the storage regions B11 to B14 and the content of each of the storage regions A21 to A24 is the same as the content of each of the storage regions B21 to B24, the access flag of the storage region E1 is set to 0. Meanwhile, when it is determined to be NO in step SC4, the access flag of the storage region E1 is set to 1. Meanwhile, in the flag storage region 6C, a single storage region may be provided for every three rows or four rows while the single storage region is not provided for every two rows of the pixels 110. That is, the storage region is not limited to every two rows and may be configured to be provided for every plurality of rows.

In this configuration, the access to the RAM 4 can be reduced when the data line driving circuit 140 is controlled in step SB14, so that the power consumption can be restricted.

Figure 26:
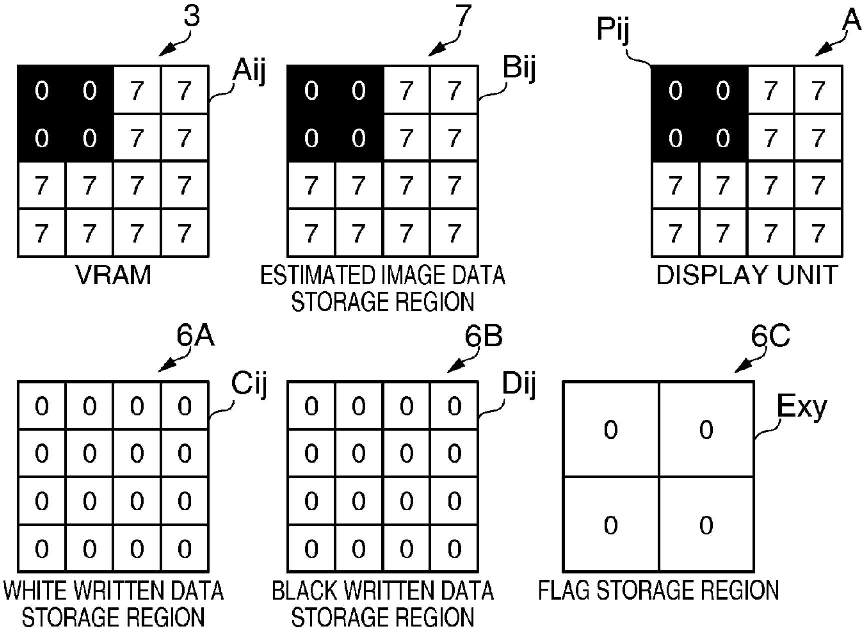
FIG. 26 is a view illustrating the flag storage region according to the modification example.

Further, instead of providing a single storage region for each row of the pixels 100 in the flag storage region 6C, a configuration may be made such that a single storage region Exy is provided for total 4 pixels 110 having 2 rows in the row direction and 2 columns in the column direction as shown in FIG. 26. In the flag storage region 6C shown in FIG. 26, for example, a storage region E11 corresponds to pixels P11, P12, P21 and P22, and a storage region E12 corresponds to pixels P13, P14, P23, and P24.

In this configuration, the processes of step SB2, step SB3, step SB9, and step SB10 are removed from the process shown in FIG. 6. Further, in order to update the content of the flag storage region 6C, a process shown in FIG. 27 is performed before the process of step SB14 is performed, thereby updating the data of each storage region of the flag storage region 6C.

Figure 27:
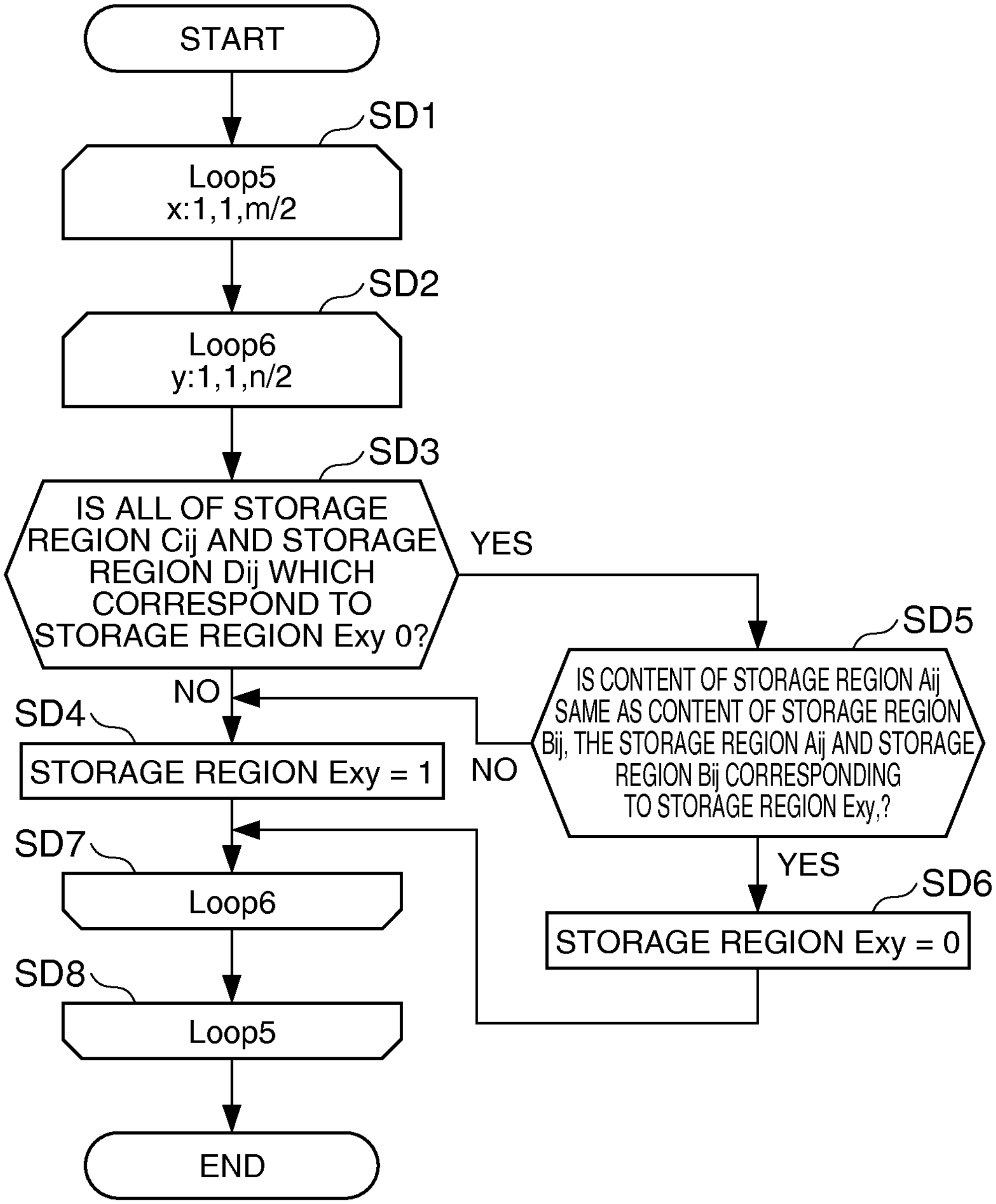
FIG. 27 is a flowchart illustrating the flow of the process performed by the controller in the modification example.

In the process of FIG. 27, a variable x and a variable y are increased by performing the processes of a loop 5 and a loop 6. Thereafter, when the entire storage region Cij and storage region Dij which correspond to the storage region Exy are not 0 (NO in step SD3), the access flag of the storage region Exy is set to 1. For example, when x=1 and y=1 and when any of the values of the storage regions C11, C12, C21, and C22 and the storage regions D11, D12, D21, and D22 is not 0, the access flag of the storage region E11 is set to 1. Further, when it is determined to be YES in step SD3 and when the content of the storage region Cij and the storage region Dij which correspond to the storage region Exy is the same (YES in step SD5), the access flag of the storage region Exy is set to 0. For example, when x=1 and y=1 and when the storage region A11, the storage region B11, the storage region A12, the storage region B12, the storage region A21, the storage region B21, the storage region A22, and the storage region B22 are the same, the access flag of the storage region E11 is set to 0. Meanwhile, when it is determined to be NO in step SD5, the access flag of the storage region Exy is set to 1.

Even in this configuration, access to the RAM 4 can be reduced when the data line driving circuit 140 is controlled in step SB14, so that the power consumption can be restricted.

Although the electro-optic apparatus which includes the electrophoretic layer 102 has been described as an example of an electro-optic apparatus in the above-described embodiment, the gist of the invention is not limited thereto. Any electro-optic apparatus, which performs writing in order to change the display state of pixels from a first display state to a second display state using a writing operation of applying a voltage more than once, may be used. For example, an electro-optic apparatus using electronic powder and granular material may be used.

The entire disclosure of Japanese Patent Application No. 2011-085806, filed Apr. 7, 2011 is expressly incorporated by reference herein.

What is claimed is:

1. A control apparatus of an electro-optic apparatus having a display unit which has a plurality of pixels, and in which writing is performed in order to change a display state of each of the pixels from a first display state to a second display state by applying a voltage more than once, the display unit having a plurality of regions the control apparatus comprising:

a writing region determination unit which obtains an access flag indicative of whether the writing operation is performed on pixels in each of the regions from a storage unit storing the access flag for each of the regions, and which determines whether to perform the writing operation on the pixels included in a region corresponding to the obtained access flag based on the access flag;

a writing state determination unit which, with respect to the pixels included in the region on which the writing region determination unit determined to perform the writing operation, compares image data written in a memory with estimated image data indicative of an estimated image to be displayed on the corresponding display unit by performing the writing operation in progress, and determines whether a previous writing operation is being performed on the pixels when a new writing operation is necessary;

a writing control unit which starts to perform the new writing operation on the pixels when the writing state determination unit determines that the writing operation is not in progress on the pixels, continues the writing operation in progress when the writing state determination unit determines that the writing operation is in progress on the pixels, and then starts the new writing operation after the writing operation in the progress is terminated; and a flag state change unit which changes a state of the access flag corresponding to the relevant region to a state in which the writing operation is not necessary when the writing operation performed on all pixels included in the region is terminated.

2. The control apparatus according to claim 1, wherein the plurality of pixels is provided in a plurality of rows and a plurality of columns, and a single row of the pixels corresponds to the region.

3. The control apparatus according to claim 1, wherein the plurality of pixels is provided in a plurality of rows and a plurality of columns, and a plurality of rows of the pixels corresponds to the region.

4. The control apparatus according to claim 1, wherein the plurality of pixels is provided in a plurality of rows and a plurality of columns, and a block of pixels in adjacent two or more rows and two or more columns corresponds to the region.

5. The control apparatus according to claim 1, wherein, when the image data is written in the memory, each access flag provided for each of the plurality of regions is set to a state in which the writing operation is necessary.

6. An electro-optic apparatus comprising:

a display unit which has a plurality of pixels, and in which writing is performed in order to change a display state of each of the pixels from a first display state to a second display state by applying a voltage more than once, the display unit having a plurality of regions;

a writing region determination unit which obtains an access flag indicative of whether the writing operation is performed on pixels in each of the regions from a storage unit storing the access flag for each of the regions, and which determines whether to perform the writing operation on the pixels included in a region corresponding to the obtained access flag based on the access flag;

a writing state determination unit which, with respect to the pixels included in the region on which the writing region determination unit determined to perform the writing operation, compares image data written in a memory with estimated image data indicative of an estimated image to be displayed on the corresponding display unit by performing the writing operation in progress, and determines whether a previous writing operation is being performed on the pixels when a new writing operation is necessary;

a writing control unit which starts to perform the new writing operation on the pixels when the writing state determination unit determines that the writing operation is not in progress on the pixels, continues the writing operation in progress when the writing state determination unit determines that the writing operation is in progress on the pixels, and then starts the new writing operation after the writing operation in the progress is terminated; and a flag state change unit which changes a state of the access flag corresponding to the relevant region to a state in which the writing operation is not necessary when the writing operation performed on all pixels included in the region is terminated.

7. An electronic apparatus comprising the electro-optic apparatus according to claim 6.

* * * * *